US010358870B2

(12) United States Patent
Dann et al.

(10) Patent No.: US 10,358,870 B2
(45) Date of Patent: Jul. 23, 2019

(54) METHODS AND APPARATUS FOR CONTROLLING ARCHITECTURAL OPENING COVERINGS IN MORE THAN ONE MODE

(71) Applicant: Hunter Douglas, Inc., Pearl River, NY (US)

(72) Inventors: Kevin Dann, Englewood, CO (US); Joseph Kovach, Broomfield, CO (US); Wendell Colson, Weston, MA (US); Daniel Fluckey, Pearl River, NY (US); Matthew DiFrancesco, Natick, MA (US); Michael Siebenaller, Broomfield, CO (US); Jeffrey L. Spray, Erie, CO (US)

(73) Assignee: Hunter Douglas, Inc., Pearl River, NY (US)

( * ) Notice: Subject to any disclaimer, the term of this patent is extended or adjusted under 35 U.S.C. 154(b) by 178 days.

(21) Appl. No.: 15/405,276

(22) Filed: Jan. 12, 2017

(65) Prior Publication Data
US 2017/0204661 A1     Jul. 20, 2017

Related U.S. Application Data

(60) Provisional application No. 62/308,775, filed on Mar. 15, 2016, provisional application No. 62/278,981, filed on Jan. 14, 2016.

(51) Int. Cl.
*E06B 9/74* (2006.01)
*E06B 9/322* (2006.01)
(Continued)

(52) U.S. Cl.
CPC ............... *E06B 9/74* (2013.01); *E06B 9/322* (2013.01); *E06B 9/368* (2013.01); *F16D 11/14* (2013.01);
(Continued)

(58) Field of Classification Search
CPC . E06B 9/74; E06B 9/322; E06B 9/368; E06B 2009/6809; E06B 2009/6818;
(Continued)

(56) References Cited

U.S. PATENT DOCUMENTS 4,807,686 A    2/1989  Schnebly et al.
5,039,925 A    8/1991  Schap
(Continued)

FOREIGN PATENT DOCUMENTS

EP    0783072    7/1997
FR    2631076    11/1989
(Continued)

OTHER PUBLICATIONS

Tecumseh Group, Inc., "Idler that engages/disengages w/ direction change," http://www.eng-tips.com/viewthread.cfm?qid=304782, Copyright © 1998-2014, 3 pages.
(Continued)

*Primary Examiner* — Beth A Stephan
(74) *Attorney, Agent, or Firm* — Hanley, Flight & Zimmerman, LLC

(57) ABSTRACT

A dual control architectural covering is disclosed. A dual control architectural covering includes a clutch to disengage a motor when the motor is not in use. The dual control architectural covering further includes a manual control to move the covering of the architectural opening while the motor is disengaged. The dual control architectural covering further includes a braking element to resist movement of a drive element of the covering when the motor is disengaged.

23 Claims, 18 Drawing Sheets

(51) Int. Cl.
*E06B 9/36* (2006.01)
*F16D 11/14* (2006.01)
*F16D 23/12* (2006.01)
*E06B 9/68* (2006.01)

(52) U.S. Cl.
CPC ...... *F16D 23/12* (2013.01); *E06B 2009/6809* (2013.01); *E06B 2009/6818* (2013.01); *E06B 2009/6845* (2013.01); *E06B 2009/6872* (2013.01); *E06B 2009/6881* (2013.01); *F16D 2023/123* (2013.01)

(58) Field of Classification Search
CPC ..... E06B 2009/6845; E06B 2009/6872; E06B 2009/6881; F16D 11/14; F16D 23/12; F16D 2023/123
See application file for complete search history.

(56) References Cited

U.S. PATENT DOCUMENTS

| | | | |
|---|---|---|---|
| 5,467,266 | A | 11/1995 | Jacobs et al. |
| 6,029,735 | A | 2/2000 | Nicholson |
| 6,076,592 | A | 6/2000 | Grützner |
| 6,158,563 | A | 12/2000 | Welfonder et al. |
| 6,422,965 | B1 | 7/2002 | Balli et al. |
| 6,751,909 | B2 | 6/2004 | Ranaudo |
| 7,770,961 | B2 | 8/2010 | Oxley |
| 7,839,109 | B2 | 11/2010 | Carmen, Jr. et al. |
| 8,037,922 | B2 | 10/2011 | Hawkins et al. |
| 8,368,328 | B2 | 2/2013 | Mullet et al. |
| 8,910,695 | B2 | 12/2014 | Knight |
| 8,917,027 | B2 | 12/2014 | Radermacher et al. |
| 8,931,541 | B2 | 1/2015 | Chambers et al. |
| 9,745,797 | B2 | 8/2017 | Mullet et al. |
| 2003/0188836 | A1 | 10/2003 | Whiting |
| 2008/0283200 | A1 | 11/2008 | Hummel et al. |
| 2013/0199735 | A1 | 8/2013 | Colson et al. |
| 2014/0262058 | A1 | 9/2014 | Mullet et al. |
| 2014/0290870 | A1 | 10/2014 | Colson et al. |
| 2017/0260806 | A1 | 9/2017 | Adams et al. |

FOREIGN PATENT DOCUMENTS

| | | |
|---|---|---|
| WO | 2010011751 | 1/2010 |
| WO | 2010089118 | 8/2010 |
| WO | 2012093089 | 7/2012 |
| WO | 2013129915 | 9/2013 |

OTHER PUBLICATIONS

Matlab, "Dog Clutch, Nonslip clutch based on positive engagement between interlocking teeth," http://www.mathworks.com/help/physmod/sdl/ref/dogclutch.html, retrieved on Jul. 29, 2014, 7 pages.
Wallace Machine for Jaw Clutch and Jaw Clutch Couplings for Manufacturing Industries, "Jaw Clutches and Jaw Clutch Couplings," http://www.wallacemachine.com/w7.1_jaws.htm, retrieved on Jul. 29, 2014, 2 pages.
International Searching Authority, "International Search Report and Written Opinion," issued in connection with application No. PCT/EP2017/050716, dated May 3, 2017, 17 pages.

METHODS AND APPARATUS FOR CONTROLLING ARCHITECTURAL OPENING COVERINGS IN MORE THAN ONE MODE

RELATED APPLICATIONS

This patent claims priority to and, the benefit of, the earlier filing dates of U.S. Provisional Patent Application Ser. No. 62/278,981, filed on Jan. 14, 2016, and U.S. Provisional Patent Application Ser. No. 62/308,775, filed on Mar. 15, 2016. U.S. Provisional Patent Application Ser. No. 62/278,981 and U.S. Provisional Patent Application Ser. No. 62/308,775 are hereby incorporated herein by reference in their entireties.

FIELD OF THE DISCLOSURE

This disclosure relates generally to architectural coverings and, more particularly, to methods and apparatus for controlling architectural coverings in more than one mode.

BACKGROUND

Architectural coverings such as roller blinds, vertical window coverings, horizontal window coverings, and spring-loaded window coverings provide shading and privacy. Such coverings often include a motorized apparatus connected to a covering fabric or other shading material. As a motor of the apparatus rotates, the fabric uncovers or covers an architectural structure.

BRIEF DESCRIPTION OF THE DRAWINGS

Implementations of architectural coverings constructed in accordance with principles of embodiments disclosed herein will be described through the use of the following drawings, which are not to be considered as limiting, but rather, illustrations of example manners of implementing principles of the disclosure. Many other implementations will occur to persons of ordinary skill in the art upon reading this disclosure.

DETAILED DESCRIPTION

Figure 1:
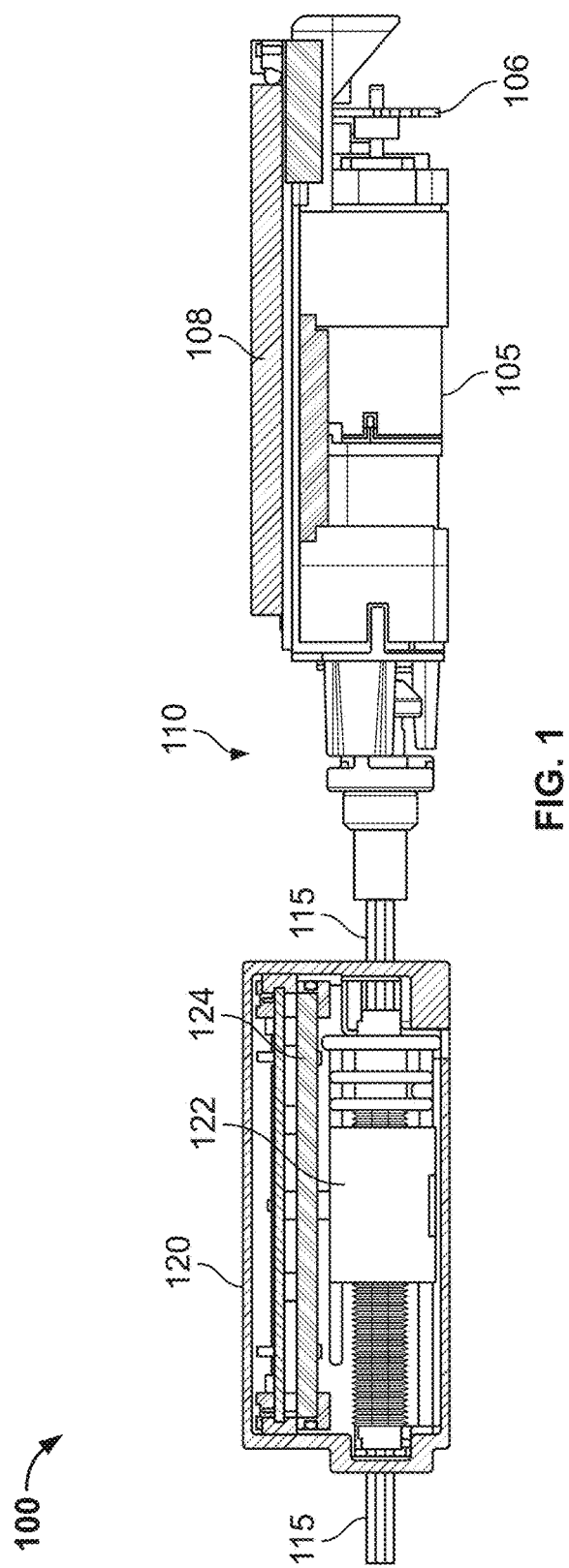
FIG. 1 illustrates an example motorized assembly constructed in accordance with one or more principles of this disclosure and including an engaging/disengaging clutch to facilitate both motorized and manual operation of a device such as the architectural covering assembly of FIG. 4.

In the operation of an architectural covering (also referred to as "covering" for the sake of convenience without intent to limit), motorized controllers are often used to lower or to raise the covering. Alternatively, the architectural covering may be manually operated to lower or to raise the covering. Combining manual and automated (e.g., motorized) operation (or other dual control operations) in an architectural covering causes problems for controllers that need to track the position of the covering by tracking the motor's operation (e.g., to operate the architectural covering to its upper and lower limits). For example, the controller of a motor can track the position of a covering by tracking the operation of the motor, but when a user manually changes the position of the covering (e.g., by hand without the use of the motor, or supplementing the motor), the controller no longer knows the exact position of the covering (e.g., because the covering position was changed by the manual control without operation of the motor). Additionally or alternatively, manually operating an architectural covering that is fixedly coupled to a motor may force rotation of the motor, which creates additional and undesirable torque to the system.

Aspects of this disclosure may increase the useful life of example apparatus for architectural coverings and related components and enables accurate positioning of the architectural coverings to be determined. Additionally and/or alternatively, aspects of this disclosure may reduce the amount of electric power consumed by such apparatus for architectural coverings. Thus, architectural coverings implementing aspects of this disclosure may operate for longer periods of time before a battery and/or other power source is replaced. All apparatus and methods discussed in this document are examples of apparatus and/or methods implemented in accordance with one or more principles of this disclosure. These examples are not the only way to implement these principles but are merely examples. Other ways to implements the disclosure principles will occur to a person of ordinary skill in the art upon reading this disclosure.

In accordance with one aspect of the disclosure, an apparatus moves an architectural covering, via a drive shaft, using either an example manual controller and/or an example electric motor. In accordance with one aspect of the disclosure, the electric motor is disengaged and/or decoupled from the drive shaft when the electric motor is not being used, such as to increase the useful life of the architectural covering and/or the electric motor. The electric motor may be disengaged from the drive shaft in different ways. For example, in accordance with one aspect of the disclosure, the example apparatus for architectural coverings includes an example cam that operatively couples the electric motor and the drive shaft when the electric motor is being used and operatively decouples the electric motor and the drive shaft when the electric motor is not being used.

In accordance with one aspect of the disclosure, the apparatus retains the architectural covering in a stationary and/or desired position when the electric motor is disengaged and/or decoupled from the drive shaft. The architectural covering may be maintained in a stationary and/or desired position in different ways. For example, in accordance with one aspect of the disclosure, the architectural covering may be kept in a stationary and/or desired position using an example braking element. As described herein, a "braking element" is any device that may be used to retain the position of the architectural covering and/or the drive shaft such as, for example and without limitation, a spring motor, a spring, a cam, a brake, etc.

In accordance with one aspect of the disclosure, the apparatus for architectural coverings enables the position of the architectural covering to be determined and/or tracked when the architectural covering is moved manually without assistance from the electric motor. In accordance with one aspect of the disclosure, the apparatus includes a first position tracking device and a second position tracking device to enable the position of the architectural covering to be determined and/or tracked when the architectural covering is moved manually and/or when the architectural covering is moved using the electric motor. The first position tracking device may be associated with moving the architectural covering with either the manual controller and/or the electric motor and the second position tracking device may be associated with moving the architectural covering with the electric motor. Additionally and/or alternatively, in accordance with one aspect of the disclosure, the second tracking device may be associated with moving the electric motor to engage and/or couple the electric motor and the drive shaft and/or to disengage and/or decouple the electric motor and the drive shaft. For example, to disengage and/or decouple the electric motor and the drive shaft, the electric motor may be reversed and/or moved a threshold amount (e.g., a quarter turn).

The first position tracking device and/or the second position tracking device may be implemented using an encoder and/or other sensor (e.g., a movement sensor) such as, for example, an electromechanical system and/or a microelectrical system (MEMS). For example, the first position tracking device may monitor the position of the architectural covering by tracking a target coupled to the drive shaft.

In accordance with one aspect of the disclosure, the apparatus causes electrical components to be powered down and/or to enter a sleep mode to reduce the amount of electric power consumed. The electrical components that may be powered down and/or caused to enter the sleep mode may include, without limitation, the electric motor, the first position tracking device, the second position tracking device, etc.

In accordance with one aspect of the disclosure, after the electrical components have been powered down and/or entered a sleep mode, the apparatus may power the electrical components up to determine the position of the architectural covering. The electrical components may be caused to be powered up periodically based on a threshold length of time being satisfied, an input being received to move the architectural covering and/or based on movement of the architectural covering being detected.

In accordance with one aspect of the disclosure, the second position tracking device is aware of the position of the architectural covering. In accordance with one aspect of the disclosure, the second position tracking device accesses position data from the first position tracking device to enable the second position tracking device to be aware of the position of the architectural covering even when the electric motor has been powered down and/or has been otherwise not been being used to move the architectural covering.

Figure 4:
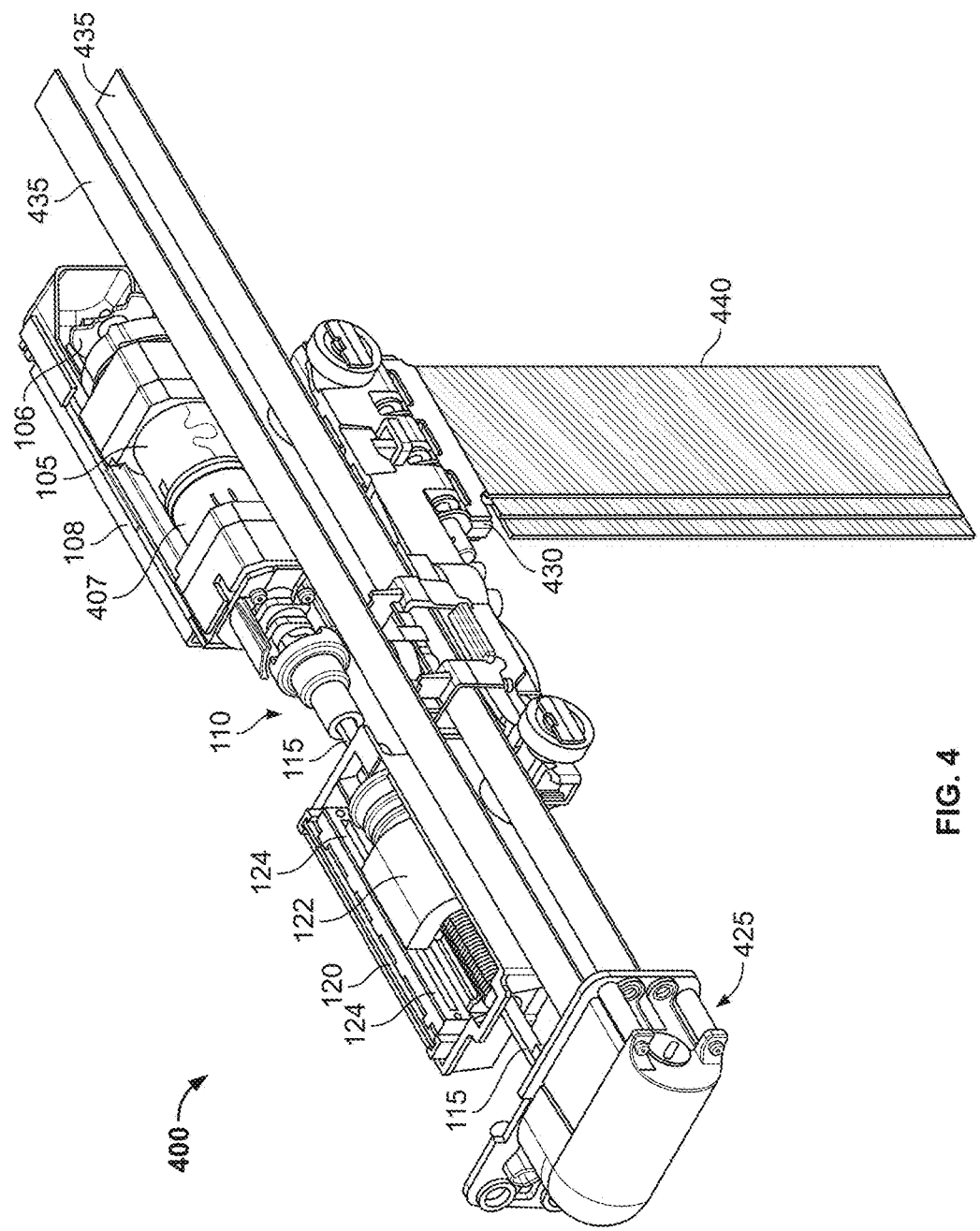
FIG. 4 illustrates an example of an implementation of a vertically stacking architectural covering constructed in accordance with one or more principles of this disclosure and including the motorized assembly with engaging/disengaging clutch of FIG. 1.
Figure 5:
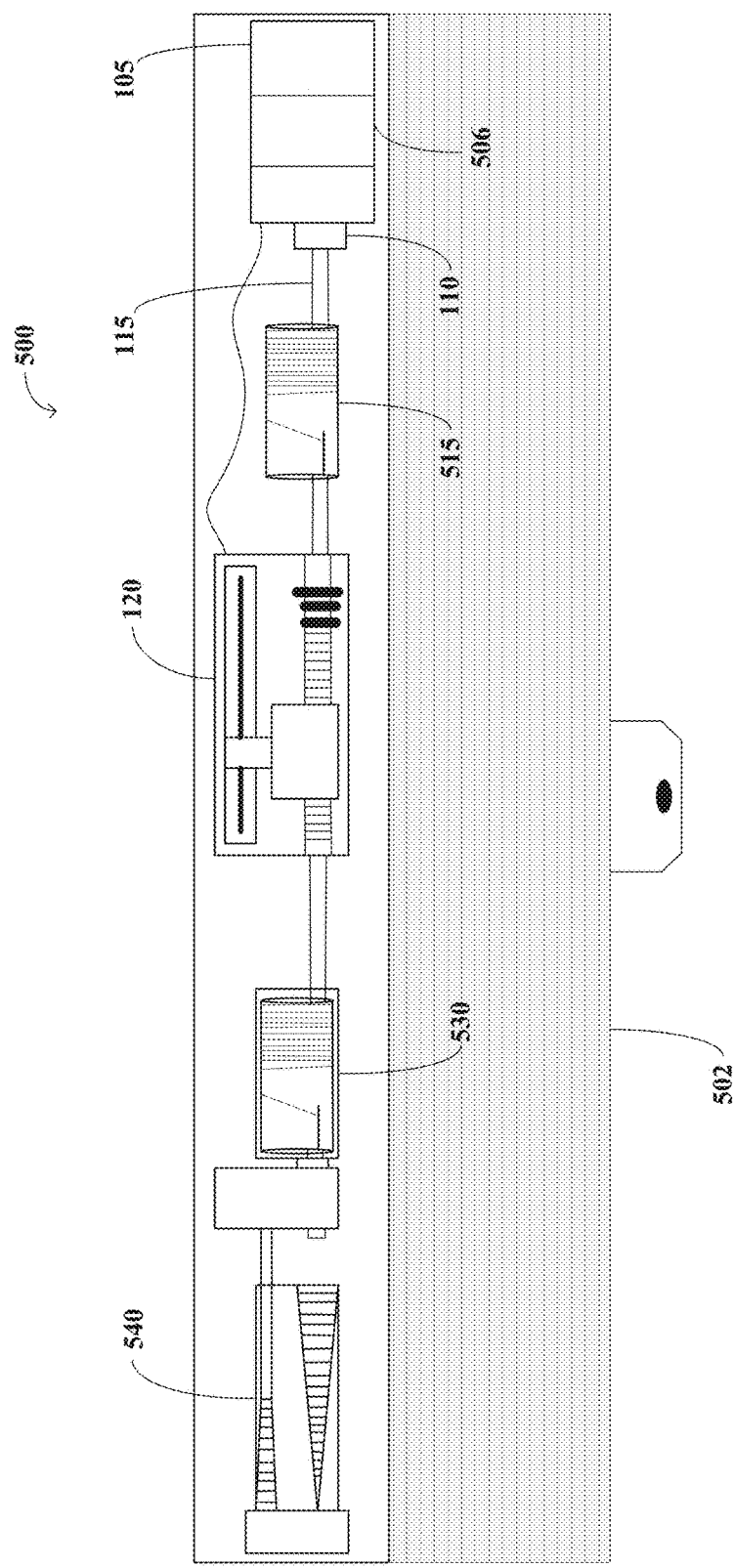
FIG. 5 illustrates an example of an implementation of a horizontal stacking architectural covering constructed in accordance with one or more principles of the disclosure and including an engaging/disengaging clutch to facilitate both motorized and manual operation.
Figure 6:
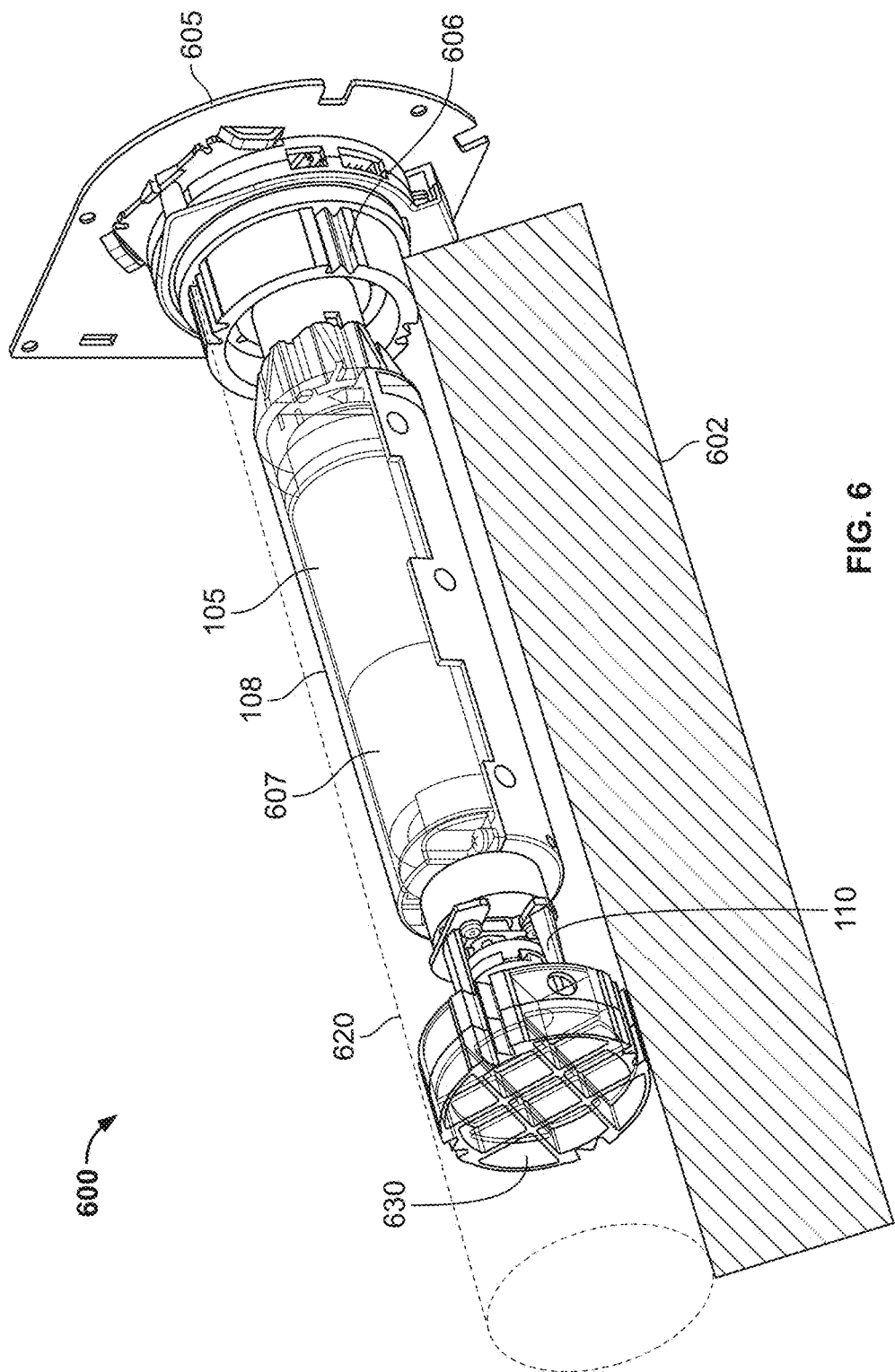
FIG. 6 illustrates an example of an implementation of a roller architectural covering constructed in accordance with one or more principles of the disclosure and including an engaging/disengaging clutch to facilitate both motorized and manual operation.
Figure 10:
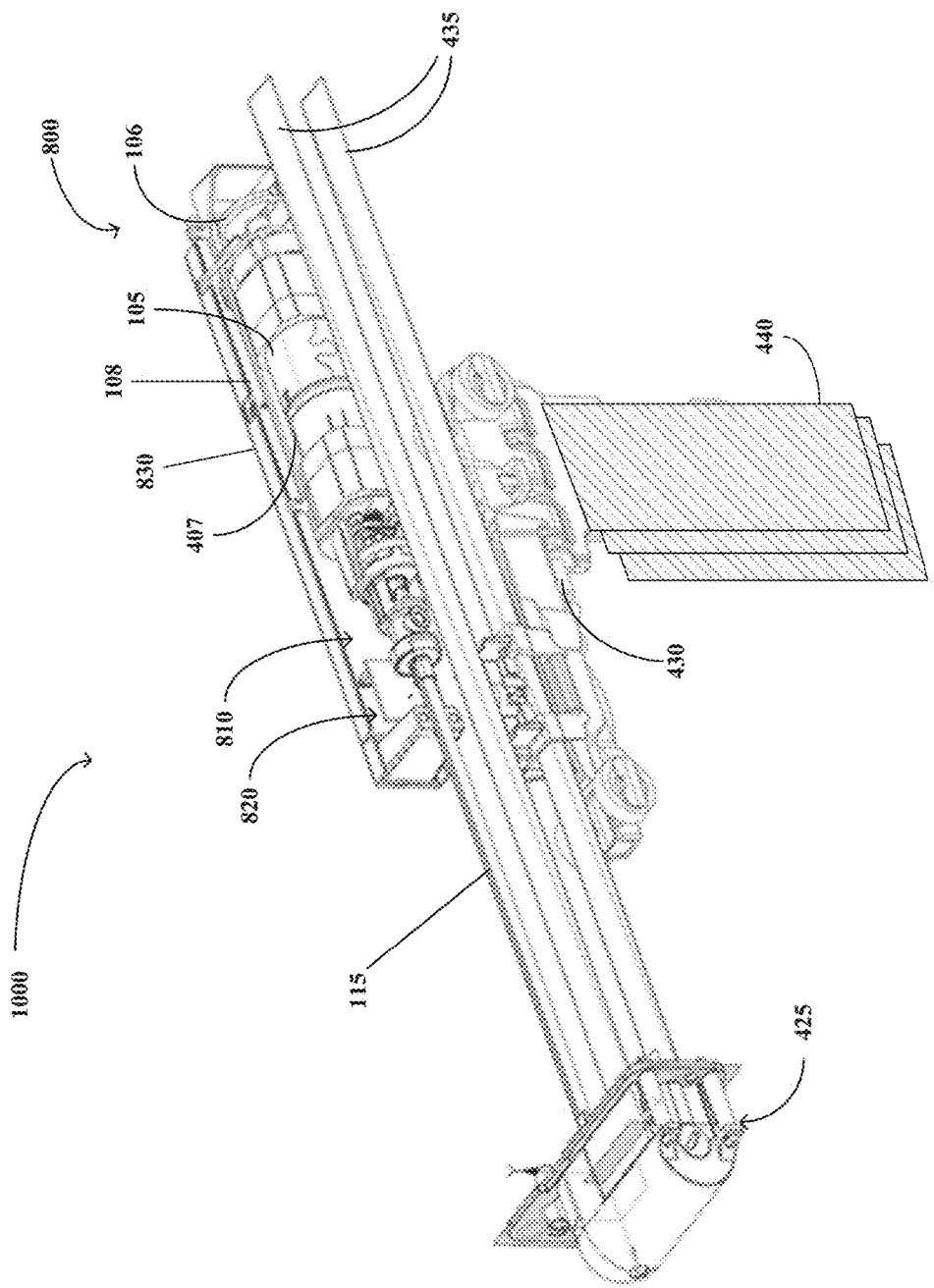
FIG. 10 illustrates an example of an implementation of a vertical stacking architectural covering constructed in accordance with one or more principles of this disclosure and including the motorized assembly with engaging/disengaging clutch and rotation rod tracking of FIG. 8.

FIG. 1 illustrates an example of a motorized assembly 100 including a clutch 110 that may be used to operate an architectural covering assembly. In the example of FIG. 1, clutch 110 of motorized assembly 100 is engaged by operation of motor 105. A rotation rod 115 (e.g., a drive shaft, linear transport, rotational element, etc.) is operatively coupled to a covering to move the covering via motorized operation (via motor 105) or to be moved by manual operation of the covering (e.g., without operating the motor 105 or in addition to motorized operation). For example, as shown in FIGS. 4 and 10 rotation rod 115 may be coupled to a translation gearbox to move a belt coupled to the covering, as shown in FIG. 5 rotation rod 115 may be coupled to a spool to cause the spool wind causing a covering to move, and as shown in FIG. 6 rotation rod 115 may be coupled to a tube interface to rotate a tube on which a covering is wound similar to the tube shown in FIG. 6. Alternatively, rotation rod 115 may drive any other covering element for moving a covering. According to the illustrated example, clutch 110 disengages motor 105 from rotation rod 115 when motorized assembly 100 is not being operated by motor 105. Disengaging clutch 110 disengages motor 105 from rotation rod 115 when motor 105 is not being operated to allow rotation rod 115 to be manually rotated, or otherwise rotated independently of motor 105, causing the covering to open or close (e.g., the covering may be opened or closed when motorized control is not available or desirable to an operator). As shown in FIGS. 4-6 and 10, components of motorized assembly 100 may be utilized in various architectural opening covering assemblies (e.g., vertical stacking architectural opening covering assembly 400, horizontal stacking architectural opening covering assembly 500, roller architectural opening covering assembly 600, and/or any other type of architectural opening covering assembly).

Motorized assembly 100 of FIG. 1 includes motor 105 coupled to architectural covering controller 108, clutch 110, rotation rod 115, and covering position encoder 120. Manual operation of motorized assembly 100 and/or rotation of motor 105, while engaged with rotation rod 115, causes rotation of rotation rod 115. While rotation rod 115 rotates, covering position encoder 120 tracks the position of the covering by tracking the rotations of rotation rod 115. The covering is mechanically connected to covering position encoder 120 via rotation rod 115. Movement of the covering is translated to rotation of rotation rod 115, and therefore is tracked by covering position encoder 120.

In the example of FIG. 1, motor 105 is an electric motor for driving the covering based on signals from architectural covering controller 108. As used herein, a covering controller 108 may include hardware, software, and/or firmware that executes commands and/or otherwise communicates with motor 105, motor encoder 106, and/or covering position encoder 120. Controller 108 could be implemented by one or more analog or digital circuit(s), logic circuit(s), programmable processor(s), application specific integrated circuit(s) (ASIC(s)), programmable logic device(s) (PLD(s)), and/or field programmable logic device(s) (FPLD(s)). Motorized assembly 100 is connected to an electrical source such as a battery and/or electrical line to provide power to motor 105, architectural covering controller 108, and/or any other component requiring external power. Motor 105 may include a rotational drive output that may be coupled to a torque transfer apparatus. Additionally or alternatively, any other type and/or combination of motor may be utilized.

In the example of FIG. 1, motor encoder 106 tracks rotations of motor 105 to determine a position of a covering, determine a number of rotations needed to move the covering to a desired position, determine when clutch 110 is engaged and/or disengaged, and/or calibrate position information with covering position encoder 120. In some example embodiments, controller 108 may operate according to the process illustrated in FIG. 13 to disengage motor 105. As used herein, an encoder may be any device that converts angular position, linear position, or motion of a shaft or axle to an analog or digital code. Motor encoder 106 may be a Hall effect sensor that detects rotations of a magnet coupled to an output (e.g., a drive shaft) of motor 105 (e.g., after motor 105 has operated to move the covering, motor encoder 106 tracks reversed operation of motor 105 to determine when motor 105 has sufficiently rotated to disengage from rotating rod 115 (as described in further detail below). Alternatively, motor encoder 106 could be located in any other location to detect rotation of an output shaft of motor 105. Motor encoder 106 may, alternatively, be any other type of device to detect rotations including a rotary encoder, a gravitational sensor, etc.

In accordance with one aspect of the disclosure, to disengage a motor from a drive element, an architectural covering assembly includes a clutch. In some aspects, the drive that may be moved by a component other than the motor and, thus, disengaging the motor by the clutch prevents such movement of the drive element from backdriving the motor, which may resist the movement and/or may damage the motor. The component other than the motor may be manual operation, a second motor, etc. The clutch may be any type of clutch to selectively engage and disengage the motor from the drive element. For example, the clutch may be a mechanical clutch, an electromechanical clutch, a spring-loaded clutch, a frictional clutch, a plate clutch, etc. In some aspects of the disclosure, the clutch may be engaged by operation of the motor. In some such aspects, the clutch may be disengaged by operating a motor in a direction that is opposite of a previous direction of operation.

In the example of FIG. 1, clutch 110 of motorized assembly 100 is provided to selectively couple motor 105 with rotation rod 115. In the example of FIG. 1, clutch 110 operationally engages rotation rod 115 and motor 105 when motor 105 is being operated and disengages rotation rode 115 and motor 105 when motor 105 is not being operated. Clutch 110 allows rotation rod 115 to be selectively controlled by motor 105 (e.g., only when rotation rod 115 is coupled with motor 105) so that manual control of rotation rod 115, independently of motor 105 (e.g., manual movement of the covering causing rotation of rotation rod 115), is achievable (e.g., when rotation rod 115 is decoupled from motor 105). As used herein, manual movement includes a rotation of rotation rod 115 driven by a force other than motor 105, such as by hand, not electrical, motorized, etc. While clutch 110 is engaged, motor 105 is rotatably coupled to rotation rod 115 to move the covering. While clutch 110 is engaged, motor 105 drives rotation of rotation rod 115. As further described in FIGS. 4-6 and 10, the rotation of rotation rod 115 is translated to movement of the covering. When motor 105 is not in use, clutch 110 disengages motor 105 from rotation rod 115 (e.g., decoupling the output of motor 105 from rotation rod 115) to permit rotation rod 115 to rotate independently of motor 105.

In the example of FIG. 1, clutch 110 disengages rotation rod 115 from motor 105 by reversing the direction of motor 105 (e.g., operating motor 105 for a preferably partial, e.g., one quarter, revolution of motor 105 in a direction opposite the direction in which motor 105 was operating to move the covering). For example, if motor 105 had been operating in a clockwise direction, clutch 110 disengages motor 105 from rotation rod 115 by operating motor 105 in a counterclockwise direction for a partial revolution. Reverse operation of motor 105 causes reverse operation of clutch 110 to disengage rotation rod 115 from motor 105. Decoupling motor 105 from rotation rod 115 allows an operator to move a covering manually without rotation rod 115 applying torque to motor 105 and/or motor 105 resisting manual operation. One non-limiting, example implementation of clutch 110 is described with reference to an example implementation of clutch 110 illustrated in FIGS. 2 and 3, described in further detail below. In some examples, motor 105 is actuated to drive the covering a desired distance, such as by motor 105 operating in a first direction. Once the covering has moved the desired distance, motor 105 operates (e.g., rotates) in a second direction opposite the first direction to cause clutch 110 to disengage motor 105 from rotation rod 115. As such, when motor 105 is at rest, clutch 110 may disengage motor 105 and rotation rod 115 so that the covering is not operatively coupled with motor 105, and manual movement of the covering may be effected without affecting motor 105. In other words, in some examples, motorized assembly 100 is always in a manual mode with motor 105 disengaged from rotation rod 115 unless motor 105 is intentionally actuated and is operating to move the covering. Clutch 110 can be engaged in both directions (e.g., clockwise and counter clockwise). Accordingly, over rotation (e.g., rotation past a point at which motor 105 is disengaged) of motor 105 while disengaging clutch 110 may re-engage clutch 110 in the opposite direction. To control disengagement of motor 105 via clutch 110 (e.g., to monitor the motors position, thereby verifying when the motor has moved in a position associated with disengagement), motorized assembly 100 may include motor encoder 106 to track movement of motor 105.

While clutch 110 in the example of FIG. 1 is a mechanical clutch that is engaged as a result of a rotation of motor 105, any other type of clutch or mechanism to selectively engage or disengage motor 105 may be utilized. For example, clutch 110 may be an electronic clutch, a pneumatic clutch, a hydraulic clutch, an electromechanical clutch, or any other type of clutch.

In the example shown in FIG. 1, architectural covering controller 108 monitors the position of the covering and controls operation of motor 105. Architectural covering controller 108 is in communication with motor 105 and covering position encoder 120. Architectural covering controller 108 receives the position of the covering, from covering position encoder 120 to allow architectural covering controller 108 to control motor 105 to position the covering at a desired location. Covering position encoder 120 tracks the position of the covering by monitoring rotations of rotation rod 115. In some examples, covering position encoder 120 tracks the covering position and motor encoder 106 tracks motor position during disengagement of motor 105 via clutch 110. In some examples, data from covering position encoder 120 is used to calibrate motor encoder 106 and vice versa. In some examples, covering position encoder 120 and motor encoder 106 are used in tandem to determine a total number of rotations to rotate motor 105 to move the covering to a desired location.

According to the illustrated examples, architectural covering controller 108 is in communication with a central controller (not illustrated) that instructs architectural covering controller 108 on operation of motorized assembly 100. For example, the central controller may command architectural covering controller 108 (and controllers of other architectural cover assemblies in, for example, a building) to drive the covering to a position that covers the associated architectural structure. In response to the command, architectural covering controller 108 determines the current position of the covering based on the position information received from covering position encoder 120 and operates motor 105 to move the covering to a closed position. For example, architectural covering controller 108 may operate motor 105 while monitoring the position of the covering via covering position encoder 120 and/or by monitoring the number of revolutions of motor 105. According to the illustrated embodiment, architectural covering controller 108 monitors the rotation of motor 105 by controlling a control signal sent to motor 105 (e.g., architectural covering controller 108 determines the number of pulses associated with revolutions that the control signal will use to drive motor 105). Alternatively, in some embodiments, architectural covering controller 108 includes and/or is communicatively coupled with a sensor (e.g., an encoder, a rotation sensor, etc.) that detects the rotation of motor 105.

Once the covering reaches a position desired by an operator (e.g., based on architectural covering controller 108 determining that motor 105 has operated for a sufficient number of resolutions to move the covering to the desired position), architectural covering controller 108 causes motor 105 to disengage from rotation rod 115. In the embodiment, clutch 110 decouples motor 105 from rotation rod 115 such as upon architectural covering controller 108 causing motor 105 to operate briefly (e.g., for a partial revolution of motor 105) in a reverse direction to disengage motor 105 from rotation rod 115. In some examples, a braking element (e.g., a motor spring or a brake) may be used to resist movement (e.g., rotation) of rotation rod 115 while motor 105 disengages from rotation rod 115. In such examples, the braking element resists rotation rod 115 from rotating such as due to the weight of the covering and/or the force of gravity. The braking element may be overcome with a small amount of applied force (e.g., during manual operation). An example implementation of architectural covering controller 108 is described in further detail in conjunction with FIGS. 11-17.

In the embodiment of FIG. 1, covering position encoder 120 includes a slider 122 that is moved by rotation of rotation rod 115. For example, covering position encoder 120 may include a gearbox, a worm gear, etc. to translate rotation of rotation rod 115 into transverse movement of slider 122. The position of slider 122 in covering position encoder 120 and, therefore, the relative position of the covering with respect to a fully open position and/or a fully closed position may be determined by resistive contacts 124 disposed along the operating path of slider 122. The position of slider 122 affects a resistance that can be measured and translated into a position (e.g., by an analog-to-digital conversion). While covering position encoder 120 of FIG. 1 is a slider-based encoder that includes resistive contacts 124, any other type of encoder for tracking rotation of rotation rod 115 and/or the position of the covering may be utilized. For example, an analog rotary encoder that may be utilized to track rotation of rotation rod 115 and/or the position of the covering is described in conjunction with FIG. 13. Alternatively, covering position encoder 120 may utilize a gravitational sensor as described in, for example, US Patent Publication No. 2012/0200247, US Patent Publication No. 2013/0199735, US Patent Publication No. 2014/0224437, US Patent Publication No. 2014/0290870, US Patent Publication No. 2014/0090787, and US Patent Publication No. 2014/0262078, each of which is hereby incorporated herein by reference in its entirety.

While architectural covering controller 108 of FIG. 1 is inside a housing of the motorized assembly 100, architectural covering controller 108 may alternatively be located apart from motorized assembly 100. For example, architectural covering controller 108 could be implemented by a computer, server, or other computing device that is in communication with motorized assembly 100. As used herein, the phrase "in communication," including variances thereof, encompasses direct communication and/or indirect communication through one or more intermediary components and does not require direct physical (e.g., wired) communication and/or constant communication, but rather additionally includes wireless communication, selective communication at periodic or aperiodic intervals, as well as one-time events.

Motorized assembly 100 may be powered by a battery pack via a cable (e.g., wire). For example, the battery pack may include twelve AA batteries. Alternatively, the battery pack may include any number and/or any type of batteries. Motorized assembly 100 may be powered by multiple battery packs. For example, motorized assembly 100 may be powered by a 12 Volt (V) capacity battery pack and an 18V capacity battery pack. In such an example, a cable(s) may electrically couple the battery packs to motorized assembly 100. The battery pack with the higher potential (e.g., 18V) initially provides current to motorized assembly 100. As the 18V battery provides current, the voltage of the battery pack will decrease (e.g., discharge). When the 18V battery pack discharges to the same voltage as the 12V battery pack, the 12V battery pack will additionally begin to provide current. One or more diodes may be used (e.g., in the cable(s)

electrically coupling the battery pack(s) to motorized assembly 100) to prevent current from being back-driven from one battery pack to the other battery pack (e.g., due to a voltage differential between the battery packs). Additionally or alternatively, motorized assembly 100 may be powered by an alternating current (AC) and/or direct current (DC) power source.

In operation, when architectural covering controller 108 receives instructions to move the covering of motorized assembly 100, architectural covering controller 108 instructs motor 105 to rotate. When present, a torque transfer apparatus translates the output of motor 105 to a higher torque for rotatably engaging clutch 110. Once clutch 110 engages rotation rod 115 with motor 105, operation of motor 105 rotates rotation rod 115. As rotation rod 115 rotates, the position of the covering is tracked by covering position encoder 120. Covering position encoder 120 sends covering position information to architectural covering controller 108. Additionally or alternatively, another sensor such as, for example, motor encoder 106 (which may be attached to motor 105), may track rotation of motor 105 and/or movement of another component of motorized assembly 100 to facilitate tracking of the position of the covering by architectural covering controller 108. Rotation of rotation rod 115 drives the covering.

When motorized operation of motorized assembly 100 is terminated (e.g., when the covering reaches a desired/commanded position, when motorized assembly 100 is commanded to stop, when motorized assembly 100 has reached a desired position, etc.), architectural covering controller 108 instructs motor 105 to disengage via clutch 110, such as by operating motor 105 in a direction opposing the direction of the previous operation. According to the illustrated example, architectural covering controller 108 drives motor 105 for a duration of the time sufficient to disengage motor 105 from rotation rod 115 via clutch 110 (e.g., for a duration of time sufficient to rotate clutch 110 a partial revolution, such as one quarter revolution, in the opposite direction from which motor 105 had been rotating). Additionally, motor encoder 106 tracks the rotation of motor 105 to allow architectural covering controller 108 to determine the appropriate amount of rotation to disengage motor 105 via clutch 110. Once disengaged from motor 105 by clutch 110, rotation rod 115 can by rotated manually without resistance from and/or torque applied to motor 105. For example, a user may move the covering using an attached wand, other tool, or by hand. Moving the covering drives rotation rod 115. Covering position encoder 120 tracks rotation of rotation rod 115 and sends covering position information to architectural covering controller 108. Accordingly, covering position encoder 120 can track the covering position when the covering is manually moved. In some embodiments, covering position encoder 120 does not require electricity to track the covering position (e.g., where covering position encoder 120 is mechanically operated (such as a slider encoder) and the position is reported whenever electricity is supplied). In such embodiments, even when the covering is manually operated when power is not supplied (e.g., during a power outage), architectural covering controller 108 can determine the covering position, based on the covering position encoder 120, once power is supplied (e.g., after the power outage ends) without having to perform a calibration procedure (e.g., moving the covering to a predetermined position to calibrate the encoders, requesting a user to calibrate motorized assembly 100, etc.).

Figure 2:
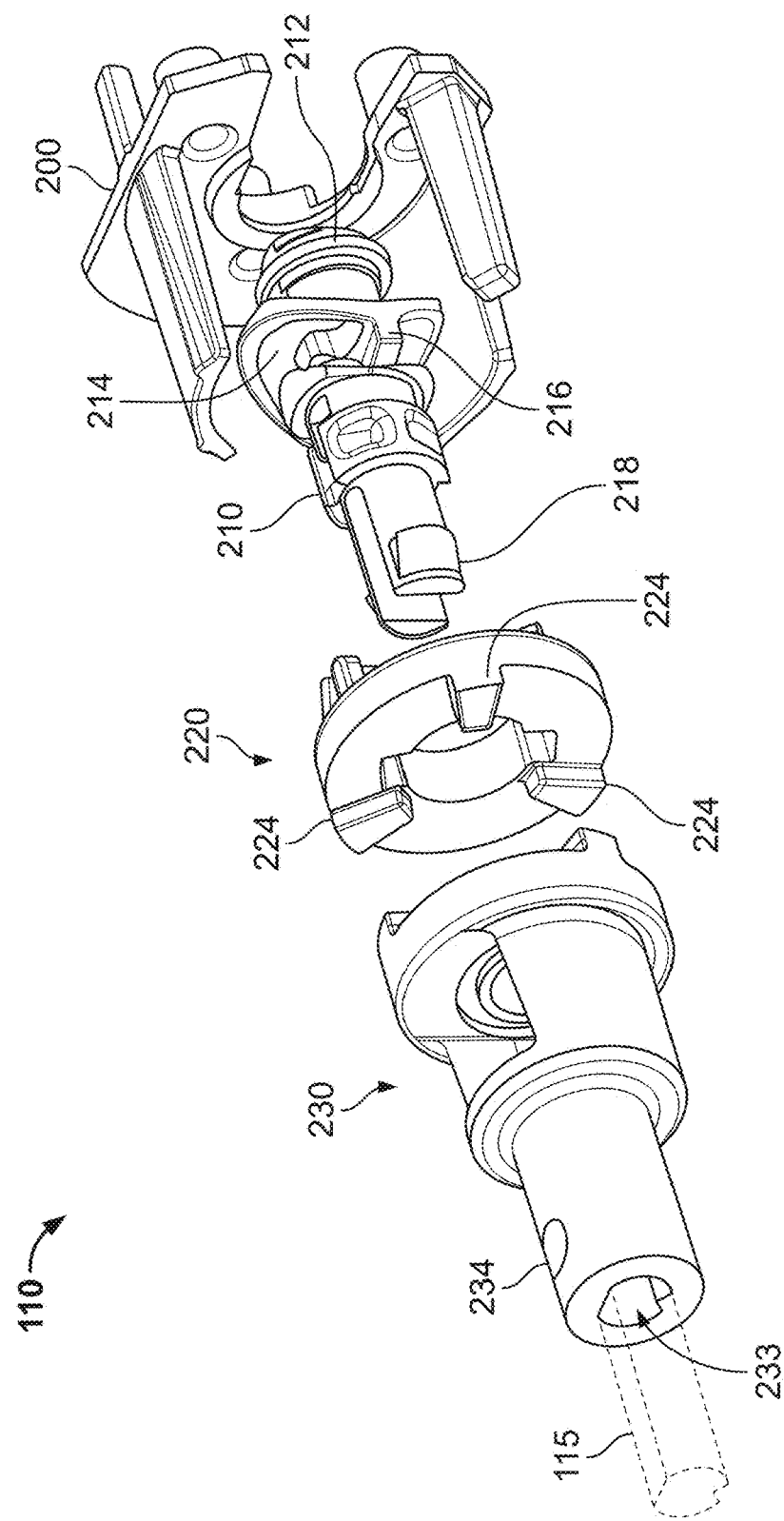
FIGS. 2 and 3 illustrate an example of an implementation of an engaging/disengaging clutch constructed in accordance with the disclosure and which may be used to implement the clutch of FIG. 1.
Figure 3:
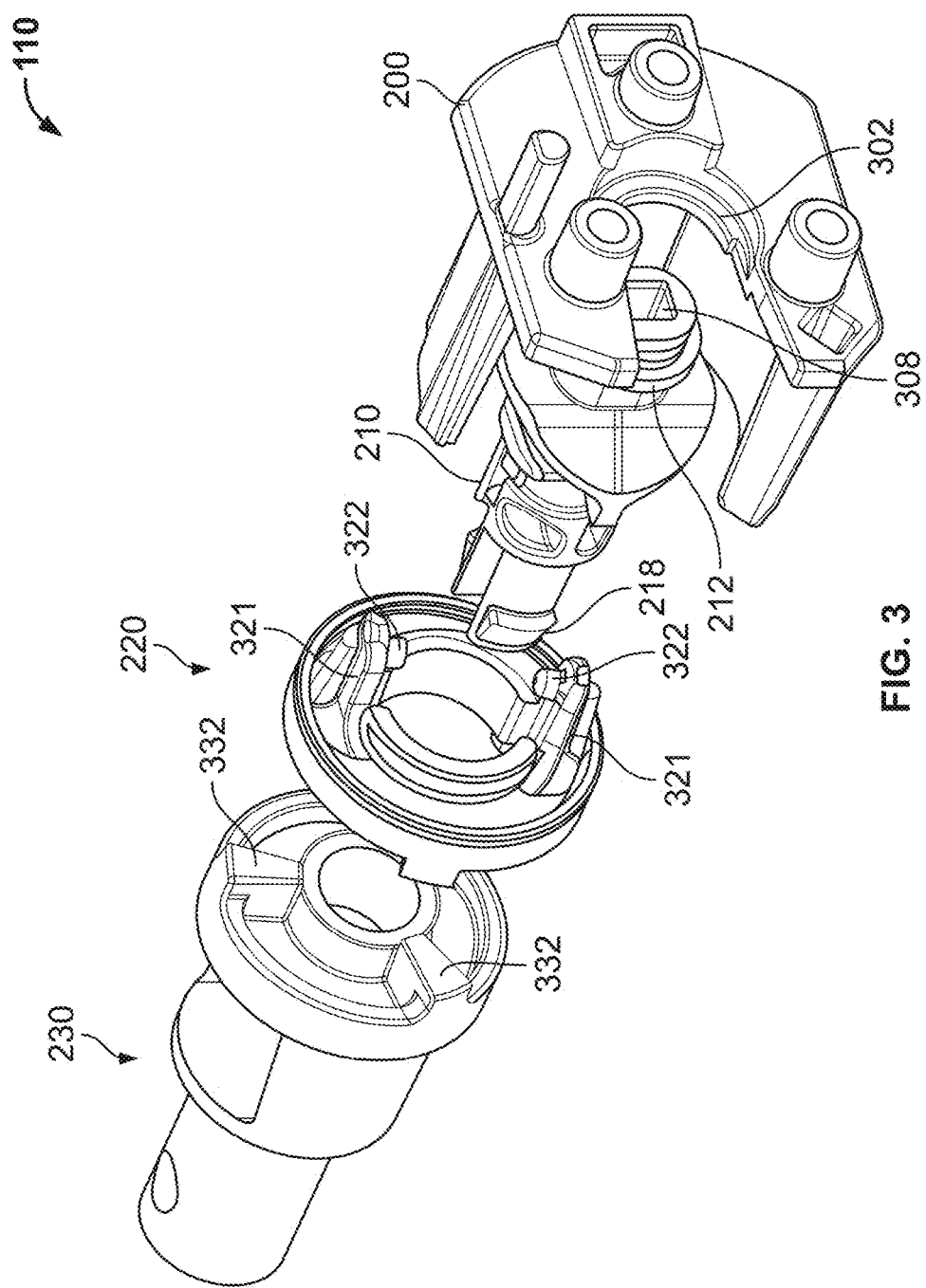

FIGS. 2 and 3 illustrate a front and back view, respectively, of an example of an implementation of clutch 110 of FIG. 1. Clutch 110 of FIG. 2 is described with reference to motorized assembly 100 of FIG. 1. Alternatively, clutch 110 of FIG. 2 may be utilized with any type of motorized assembly and/or may be utilized in any assembly in which an engaging/disengaging clutch may be useful. Clutch 110 of FIG. 2 comprises clutch housing unit 200, elongated member 210, cam follower 220, and drive gear 230.

Clutch housing unit 200 of FIGS. 2 and 3 includes ringed slot 302 (FIG. 3) configured to receive ringed surface 212 of elongated member 210 to allow elongated member 210 to rotate within clutch housing unit 200. Clutch housing unit 200 preferably remains stationary (e.g., fixedly attached to an architectural structure) while elongated member 210 rotates (e.g., due to operation of motor 105 coupled to elongated member 210). Elongated member 210 includes a channel 308 (FIG. 3) for receiving an output shaft of motor 105 to couple the output of motor 105 with elongated member 210. Alternatively, the output of motor 105 may be coupled to a torque transfer apparatus, thus, in such an example, elongated member 210 receives an output shaft of torque transfer apparatus. Thus, motion of motor 105 (e.g., rotation of motor shaft) is translated to elongated member 210, thereby causing elongated member 210 to be rotated.

Elongated member 210 of the illustrated embodiments comprises clip 218 to releasably couple elongated member 210 with drive gear 230, thereby coupling cam follower 220 between elongated member 210 and drive gear 230. Clip 218 allows drive gear 230 and elongated member 210 to rotate independently subject to the interaction of other components of elongated member 210 and drive gear 230. Alternatively, any other type of fastener that allows elongated member 210 to rotate may be utilized (e.g., elongated member 210 may be threaded to receive a threaded nut).

Cam follower 220 comprises protrusions 321, which include cam follower knobs 322 (FIG. 3). Elongated member 210 is coupled to cam follower 220 by clip 218, cam follower knobs 322 of cam follower 220 are mated with a cammed surface 214 of elongated member 210. Elongated member 210 may include two cammed surfaces 214 that each preferably comprise approximately one half the circumference of elongated member 210 and each receive one of the two cam follower knobs 322. Alternatively, any desired number of cammed surfaces 214 and cam follower knobs 322 may be utilized (e.g., 1, 2, 3, etc.). Each circumferential end of cammed surface 214 terminates with a stop 216.

Cammed surface 214 is grooved to keep cam follower knobs 322 engaged with cammed surface 214. When elongated member 210 is rotated in a first direction, cammed surface 214 drives cam follower knobs 322 toward stops 216, and thus moves cam follower 220 toward drive gear 230. Conversely, as cam follower knobs 322 are moved away from stops 216 (e.g., by reversing operation of motor 105 in a second direction opposite the first direction), cam follower knobs 322 move along cammed surface 214 of elongated member 210 in a direction away from stops 216, driving cam follower 220 away from drive gear 230.

Once cam follower knobs 322 are met by stops 216 of elongated member 210 (e.g., when cam follower 220 is fully extended toward drive gear 230), stops 216 of elongated member 210 facilitate rotation of cam follower 220 in unison with elongated member 210. Conversely, when the direction of rotation is reversed, stops 216 and cam follower knobs 322 will no longer be in contact, therefore cam follower 220 will stop rotating and cam follower 220 will be moved away from drive gear 230 as cam follower knobs 322 are moved deeper into cammed surface 214 of elongated member 210. Additionally, motor 105 may continue rotating elongated member 210 in the opposite direction until cam follower knobs 322 move up cammed surface 214 to push cam follower 220 toward drive gear 230. Once cam follower knobs 322 reach a stop (e.g., stop 216 or a stop on the opposite side of elongated member 210), cam follower 220 will be fully extended and, therefore, engage once again with drive gear 230. Once cam follower 220 is engaged with drive gear 230, motor 105 (FIG. 1) drives rotation of rotation rod 115 via drive gear 230 in the opposite direction of rotation. For example, an output shaft of motor 105 rotates elongated member 210 rotating cam follower 220. The rotation of cam follower 220 rotates drive gear 230 which rotates rotation rod 115 (FIG. 1). Accordingly, to disengage motor 105 via clutch 110 of FIGS. 2 and 3 after rotation in a first direction, elongated member 210 should be rotated in a second, opposing, direction until cam follower 220 is retracted and before cam follower 220 is extended.

Cam follower 220 comprises a keyed surface 224 which is selectively engaged with a mating keyed surface 332 of drive gear 230. When elongated member 210 is rotated and cam follower knobs 322 travel across cammed surface 214, keyed surface 224 of cam follower 220 is moved into engagement with mating keyed surface 332 of drive gear 230.

Once cam follower knobs 322 reach and are engaged by stops 216, the rotation of elongated member 210 drives rotation of cam follower 220. When keyed surface 224 is engaged with mating keyed surface 332, rotation of cam follower 220 causes drive gear 230 to be rotated. Thus, clutch 110 is engaged when elongated member 210 is rotated far enough (1) to cause cam follower 220 to be axially engaged with drive gear 230 and/or (2) to cause stops 216 to drive rotation of cam follower 220. Conversely, motor 105 (FIG. 1) is disengaged when elongated member 210 is rotated in a direction opposite the direction of the engaging rotation to rotate cammed surface 214 to a position at which (1) cam follower knobs 322 are away from stops 216 and (2) cam follower 220 is moved axially away from drive gear 230, thereby disengaging keyed surface 224 from mating keyed surface 332.

Drive gear 230 of FIG. 2 has a keyed hub 233 to receive rotation rod 115 and to couple rotation rod 115 to clutch 110. Drive gear 230 preferably includes a hole 234 that contains a set screw to secure drive gear 230 to rotation rod 115. Because drive gear 230 preferably is fixedly coupled to rotation rod 115, drive gear 230 rotates with rotation of rotation rod 115. Alternatively, clutch 110 may contain one or more keys on keyed surface 224, keys on mating keyed surface 332, additional holes 234 on drive gear, etc. to couple rotation rod 115 with drive gear 230 and, more generally, clutch 110, so that rotation of one of rotation rod 115 and drive gear 230 causes rotation of the other of rotation rod 115 and drive gear 230.

In one aspect of the disclosure, the example implementation of clutch 110 of FIG. 2 may be utilized to implement clutch 110 in motorized assembly 100 of FIG. 1. In this aspect of the disclosure, in operation of motorized assembly 100, when motor 105 of FIG. 1 receives a signal to rotate rotation rod 115, motor 105 begins to rotate the attached elongated member 210. As elongated member 210 rotates, cam follower knobs 322 move across cammed surface 214 until cam follower knobs 322 are stopped by stops 216 while cam follower 220 is extended towards drive gear 230. Once in this extended position, cam follower 220 rotates with the rotation of motor 105 (e.g. rotation of elongated member 210, which may be driven by a torque transfer apparatus). In this extended position, keyed surface 224 of rotating cam follower 220 engages mating keyed surface 332 of drive gear 230. Once engaged, drive gear 230 and rotation rod 115 (coupled to drive gear 230) rotate with the rotation of cam follower 220. Accordingly, in architectural opening covering assembly 400 of FIG. 4, the rotation of rotation rod 115 by drive gear 230 causes the covering to be moved to open or close covering 440 of architectural opening covering assembly 400.

After operating motor 105 to move the covering to a desired/commanded position, architectural covering controller 108 causes clutch 110 to disengage rotation rod 115 from motor 105 to facilitate manual operation (e.g., a rotation of rotation rod 115 driven by a force other than motor 105), if desired, until the next motorized operation. Architectural covering controller 108 reverses the output of motor 105 for a partial (e.g., one quarter) revolution of elongated member 210 to allow cam follower 220 to be disengaged from drive gear 230. When cam follower 220 is moved away from drive gear 230, keyed surface 224 decouples from mating keyed surface 332. Once cam follower 220 is disengaged from drive gear 230, rotation rod 115 can be rotated independently of elongated member and, thereby, motor 105.

Aspects of the disclosure may be utilized in any type of architectural structure covering. For example, one or more of a clutch, braking element, position tracking device(s), controller that wakes from a sleep state, may be utilized with any type of architectural covering such as a vertically stacking architectural covering, a horizontal stacking architectural covering, a corded architectural covering, a roller architectural covering, etc. For example, FIGS. 4 and 10 illustrate example embodiments of architectural covering assemblies including one or more aspects of the disclosure. FIGS. 4 and 10 illustrate an example implementations of vertically stacking (or tiered) architectural coverings, FIG. 5 illustrates an example implementation of a horizontal stacking architecture covering, and FIG. 6 illustrates describes an example implementation of a roller architectural covering.

FIG. 4 illustrates one example implementation of a vertical stacking architectural covering assembly 400 constructed in accordance with aspects of the disclosure. Vertical stacking architectural covering assembly 400 of FIG. 4 includes motor 105 coupled to torque transfer apparatus 407, motor encoder 106, architectural covering controller 108, clutch 110, rotation rod 115, covering position encoder 120, translational gearbox 425, moving rail assembly 430, shade drive mechanism 435, and covering 440. Covering 440 is attached to moving rail assembly 430 to selectively cover an architectural structure, to provide shading, privacy, etc. As shade drive mechanism 435 moves, moving rail assembly 430, which is attached to shade drive mechanism 435, slides across the architectural structure to move covering 440 to cover or to uncover the architectural structure. Moving rail assembly 430 can be moved manually or can be moved by driving shade drive mechanism 435 with motor 105. Operating motor 105 causes the rotation rod 115 to rotate causing moving rail assembly 430 to move via translation gearbox 425.

Moving rail assembly 430 may include a user touch point, such as a wand or other tool (e.g., a cord, a chain, etc.) attached to moving rail assembly 430 for manual unmotorized operation of vertical stacking architectural covering assembly 400. Moving the wand, such as by hand, and, thus, moving rail assembly 430 and covering 440, causes shade drive mechanism 435 to move along with moving rail assembly 430. Movement of shade drive mechanism 435 may be translated into rotation of rotation rod 115, such as by translational gearbox 425 (in the embodiment of FIG. 1, a 90-degree gearbox) and vice versa. While rotation rod 115 rotates, covering position encoder 120 tracks the position of moving rail assembly 430 by tracking the rotations of rotation rod 115. Moving rail assembly 430 is mechanically connected to covering position encoder 120 via rotation rod 115. Movement of moving rail assembly 430 is translated to rotation of rotation rod 115, and therefore is tracked by covering position encoder 120.

In the example of FIG. 4, motor encoder 105 may be a Hall effect sensor that detects rotations of an output of torque transfer apparatus 407 (e.g., after motor 105 has operated to move moving rail assembly 430, motor encoder 106 tracks reversed operation of motor 105 to determine when motor 105 has sufficiently rotated an output of torque transfer apparatus 407 to disengage clutch 110 (e.g., one quarter rotation)). Alternatively, motor encoder 105 could be located in any other location to detect rotation of an output shaft of motor 105, rotations of a component of torque transfer apparatus 407, etc.

In the example of FIG. 4, torque transfer apparatus 407 includes a gear ratio to translate rotational output of motor 105. The output of torque transfer apparatus 407 is a higher torque at a slower rotation to rotate rotation rod 115. Alternatively, another apparatus to adjust the torque and/or rotation speed of motor 105 may be utilized or, if motor 105 has a sufficient torque and/or rotation speed to move moving rail assembly 430, torque transfer apparatus 407 need not be utilized. Torque transfer apparatus 407 may be a planetary gear assembly, a helical gear assembly, and/or any other gear assembly.

In the example of FIG. 4, clutch 110 of architectural covering assembly 400 is provided to selectively couple motor 105 (such as via torque transfer apparatus 407) with rotation rod 115. In the example of FIG. 4, while engaged, motor 105 drives rotation of rotation rod 115. The rotation of rotation rod 115 is translated to movement of moving rail assembly 430 by translational gearbox 425. When motor 105 is not in use, clutch 110 disengages motor 105 from rotation rod 115 to permit rotation rod 115 to rotate independently of motor 105 (e.g., decoupling the output of motor 105 from rotation rod 115).

In the example of FIG. 4, clutch 110 disengages rotation rod 115 from motor 105 by reversing the direction of motor 105 (e.g., operating motor 105 for a preferably partial, e.g., one quarter, revolution of motor 105 and/or output of torque transfer apparatus 407 in a direction opposite the direction in which motor 105 was operating to move moving rail assembly 430). For example, if motor 105 was previously operating in a clockwise direction, clutch 110 disengages rotation rod 115 from motor 105 when motor 105 is operated in a counterclockwise direction (e.g., for a partial revolution). Reverse operation of motor 105 causes reverse operation of the output of torque transfer apparatus 407, when present, which is coupled to the input of clutch 110, thereby causing reverse operation of clutch 110 to disengage rotation rod 115 from motor 105 and torque transfer apparatus 407.

In the example shown in FIG. 4, architectural covering controller 108 monitors the position of moving rail assembly 430 and controls operation of motor 105. Architectural covering controller 108 is in communication with motor 105 and covering position encoder 120. Architectural covering controller 108 receives the position of moving rail assembly 430 and, thereby, covering 440, from covering position encoder 120 to allow architectural covering controller 108 to control motor 105 to position moving rail assembly 430 at a desired location. Covering position encoder 120 tracks the position of moving rail assembly 430 by monitoring rotations of rotation rod 115.

Once moving rail assembly 430 reaches a position desired by an operator (e.g., based on architectural covering controller 108 determining that motor 105 has operated for a sufficient number of revolutions to move moving rail assembly 430 to the desired position), architectural covering controller 108 causes motor 105 to disengage from rotation rod 115. As described above, motor 105, architectural covering controller 108, motor encoder 106, and/or covering position encoder 120 may be powered by a battery(ies), a battery pack(s), an AC power source, a DC power source, and/or combination of power sources.

While architectural covering controller 108 of FIG. 4 is inside a housing of the vertical stacking architectural covering assembly 400, architectural covering controller 108 may alternatively be located apart from vertical stacking architectural covering assembly 400. For example, architectural covering controller 108 could be implemented by a computer, server, or other computing device that is in communication with vertical stacking architectural covering assembly 400.

In operation, when architectural covering controller 108 receives instructions to move covering 440 of architectural covering assembly 400, architectural covering controller 108 instructs motor 105 to rotate. When present, torque transfer apparatus 407 translates the output of motor 105 to a higher torque for rotatably engaging clutch 110. Once clutch 110 engages rotation rod 115 with motor 105 (such as via torque transfer apparatus 407), operation of motor 105 rotates rotation rod 115. As rotation rod 115 rotates, the position of covering 440 is tracked by covering position encoder 120. Covering position encoder 120 sends covering position information to architectural covering controller 108. Additionally or alternatively, another sensor such as, for example, motor encoder 106 (which may be attached to motor 105), may track rotation of motor 105 and/or movement of another component of vertical stacking architectural covering assembly 400 to facilitate tracking of the position of covering 440 by architectural covering controller 108. Rotation of rotation rod 115 drives moving rail assembly 430, such as by driving shade drive mechanism 435. In the embodiment of FIG. 4, gearbox 425 translates rotation of rotation rod 115 into movement of shade drive mechanism 435, and, as shade drive mechanism 435 moves, moving rail assembly 430 and, thus, an attached covering, are moved.

When motorized operation of vertical stacking architectural covering assembly 400 is terminated (e.g., when covering 440 reaches a desired/commanded position, when vertical stacking architectural covering assembly 400 is commanded to stop, when vertical architectural covering assembly 400 has reached a desired position, etc.), architectural covering controller 108 instructs motor 105 to disengage clutch 110, such as by operating motor 105 in a direction opposing the direction of the previous operation. According to the illustrated example, architectural covering controller 108 drives motor 105 for a duration of the time sufficient to disengage clutch 110 (e.g., for a duration of time sufficient to rotate clutch 110 a partial revolution, such as one quarter revolution, in the opposite direction from which motor 105 had been rotating). Additionally, motor encoder 106 tracks the rotation of motor 105 to allow architectural covering controller 108 to determine the appropriate amount of rotation to disengage clutch 110. Once disengaged from motor 105 by clutch 110, rotation rod 115 can by rotated manually without resistance from and/or torque applied to motor 105 and/or torque transfer apparatus 407. For example, a user may move the moving rail assembly 430 using a user touchpoint, such as an attached wand, other tool, or by hand. Moving the moving rail assembly 430 drives rotation rod 115 such as by moving shade drive mechanism 435, which causes rotation of rotation rod 115 such as via translational gearbox 425 (which translates the movement of shade drive mechanism 435 into rotation of rotation rod 115). Covering position encoder 120 tracks the rotation of rotation rod 115 and sends covering position information to architectural covering controller 108. Accordingly, covering position encoder 120 can track the covering position when covering 440 is manually moved. In some embodiments, covering position encoder 120 does not require electricity to track the covering position (e.g., where covering position encoder 120 is mechanically operated (such as a slider encoder) and the position is reported whenever electricity is supplied). In such embodiments, even when covering 440 is manually operated when power is not supplied (e.g., during a power outage), architectural covering controller 108 can determine the covering position, based on covering position encoder 120, once power is supplied (e.g., after the power outage ends) without having to perform a calibration procedure (e.g., moving covering 440 to a predetermined position to calibrate the encoders, requesting a user to calibrate vertical architectural covering assembly 400, etc.).

In accordance with one aspect of the disclosure, a braking element may be included in an architectural covering to resist movement (e.g., rotation, linear movement, etc.) of the drive element while the motor is disengaged from the covering. The braking element may be a spring motor, a brake, and/or any other device to resist movement of a drive element. The braking element is coupled (e.g., directly or indirectly), to the drive element to resist the movement. The braking element provides enough hold to resist the drive element from moving without additional force being applied (e.g., the braking element causes the system to remain in balance or stasis). In this manner, the braking element does not prevent movement of the covering from manual operation when a user applies some force to the covering to move the covering (e.g., when the user applies sufficient force to overcome the resistive force of the braking element). Accordingly, the braking element holds the drive element substantially steady while the clutch disengages the motor from the drive element and/or while the motor is disengaged. The braking element may be included in any type of architectural covering assembly. For example, the braking element may be included in an architectural covering in which a force other than the forces due to manual operation or motorized operation are present. For example, the braking element may be included in a covering in which the force of gravity influences the covering position (e.g., acts to bias the covering towards an unwound or closed position). Such an architectural covering assembly may include the braking element to counteract the force of gravity so that the covering remains at a position established by manual and/or motorized movement of the covering. In accordance with some aspects of the disclosure, when a motor is engaged with the drive element, the motor, even when not operating, applies a holding force that resists movement of the covering (e.g., may hold the covering at a selected position). In some such aspects, to allow manual operation (as previously described), a clutch may be included to disengage the motor from the drive element when the motor is not operating. In some such aspects, the architectural covering assembly may include the braking element to resist movement of the covering and replace a holding force that is removed when the motor is disengaged from the drive element.

FIG. 5 illustrates one example implementation of a horizontal stacking architectural covering assembly 500 constructed in accordance with aspects of the disclosure. FIG. 5 illustrates a horizontal stacking architectural covering assembly 500 that is capable of motorized and manual operation. Horizontal stacking architectural covering assembly 500 comprises covering 502, motor 105 coupled to gearbox 506, clutch 110, cord spools 515 and 530, covering position encoder 120, rotation rod 115, and spring motor 540. Horizontal stacking architectural covering assembly 500 may be manually lowered by pulling covering 502 down, or otherwise causing downward motion, to lower covering 502. For example, covering 502 may be coupled, via mechanical or chemical fasteners, to cord spools 515 and 530, which are rotatably coupled to rotational rod 115. In this manner, movement of covering 502 causes rotation of rotational rod 115, thereby unwinding cord spools 515 and 530. In some embodiments, cord spools 515 and 530 may be keyed to match a profile of rotational rod 115. Alternatively, spools 515 and 530 may be any type of cord take-up mechanism. Additionally or alternatively, horizontal stacking architectural covering assembly 500 may include a manual touchpoint or control (e.g., a tab, a chain, etc.) to move covering 502. As described above, motor 105 and/or covering position encoder 120 may be powered by a battery(ies), a battery pack(s), an AC power source, a DC power source, and/or combination of power sources.

Horizontal stacking architectural covering assembly 500 of FIG. 5 may be manually raised by lifting, or otherwise causing upward motion of, covering 502. In some embodiments, when covering 502 is raised spring motor 540 winds cord spools 515 and 530. Spring motor 540 contains one or more springs (e.g., constant torque spring(s)) rotatably coupled to rotation rod 115. Spring motor 540 is wound and/or unwound as rotation rod 115 moves (e.g., rotates). Winding spring motor 540 generates an upward force to aid in the movement of covering 502. The upward force resists uncoiling in the direction corresponding to lowering covering 502, thereby providing a static state that prevents movement of rotation rod 115 without additional force (e.g., motorized force or manual force) being applied. Additionally, spring motor 540 provides lift in a second direction corresponding with rotating rotation rod 115 to wind cord spools 515 and 530, thereby moving covering 502 in an upward direction. Spring motor 540 may function as a braking element (e.g., balance) that balances the weight of covering 502 to resist movement (e.g., rotation) of the covering at substantially any selected position along an extension length of covering 502 allowing the operator to lower or to lift covering 502 to a desired location. Spring motor 540 resists rotation of rotation rod 115 whenever rotation rod 115 is not being rotated via motor 105 and/or manual operation. For example, spring motor 540 resists rotation of rotation rod 115 while motor 105 is disengaged or being disengaged from rotation rod 115. Manual operation (e.g., push and/or pull) of covering 502 and/or motorized operation of rotation rod 115 may overcome the limit (e.g., hold) on the rotation rod 115 applied by spring motor 540. Alternatively, spring motor 540 may be any device capable of providing a static effect on (e.g., preventing movement of) rotation rod 115.

Clutch 110 is described in conjunction with clutch 110 of FIGS. 1-3. When motor 105 operates (which may drive the output of gearbox 506), clutch 110 becomes engaged (e.g., after the input of the clutch has been operated for a partial, e.g., approximately one quarter, revolution). While clutch 110 is engaged, motor 105 rotates rotation rod 115 to raise or lower covering 502. For example, motor 105 rotates rotation rod 115 which winds or unwinds spools 515, 530 causing covering 502 to be raised or lowered. When the motorized operation ceases, motor 105 is operated in a reverse direction to disengage motor 105 via clutch 110 (e.g., by a controller such as architectural covering controller 108 described in conjunction with FIG. 1). Motor encoder 106 tracks the position of motor 105 to determine when motor 105 is fully disengaged. While motor 105 is disengaged by clutch 110, spring motor 540 maintains the position of covering 502 by resisting rotation rod 115 from moving (e.g., rotating due to a gravitational force resulting from a weight of covering 502). Resisting rotation of rotation rod 115 allows clutch 110 to properly disengage motor 105 from rotation rod 115 and maintains covering 502 at its current set point. While motor 105 is disengaged, an operator may lower or raise covering 502 by overcoming the force exerted by spring motor 540. While lowering or raising covering 502, rotation rod 115 rotates to wind or unwind the cords from cord spools 515 and 530.

Regardless of whether rotation rod 115 is rotated by manual operation or is driven by operation of motor 105, covering position encoder 120 monitors the position of the covering and transmits position data to a controller. Additionally, the position of covering 502 may be monitored by a motor encoder (e.g., such as motor encoder 106 of FIG. 1) during motorized operation as further described in FIG. 14. Thus, in horizontal stacking architectural covering assembly 500 the position of covering 502 is tracked for both manual and motorized operation.

FIG. 6 illustrates one example implementation of a roller architectural covering assembly 600 constructed in accordance with aspects of the disclosure. FIG. 6 illustrates a roller architectural covering assembly 600. Roller architectural covering assembly 600 comprises housing unit 605 (e.g., housing plate), motor 105 coupled to gearbox 607, controller 108, tube 620, clutch 110, and tube interface 630. Roller architectural covering assembly 600 includes a covering 602 wrapped around tube 620. Tube 620 rotates in one direction to unwind covering 602 (e.g., to cover an architectural structure) and rotates in the other direction to wind covering 602 (e.g., to uncover an architectural structure). As described above, motor 105 and/or architectural covering controller 108 may be powered by a battery(ies), a battery pack(s), an AC power source, a DC power source, and/or combination of power sources.

Stationary housing unit or bracket 605 attaches roller architectural covering assembly 600 to a wall or to another structure for mounting roller architectural covering assembly 600. Stationary housing unit 605 comprises tube interface 606 that rotates along with tube 620 while stationary housing unit 605 remains stationary. Tube interface 606 is keyed to attach to tube 620, but may alternatively be attached through a screw, a clip, an adhesive, and/or through any other method of attaching pieces together.

Tube interface 630 is keyed or otherwise engaged to tube 620 such that rotation of tube interface 630 drive rotation of tube 620 and rotation of tube 620 drives rotation of tube interface 630 (e.g., transferring rotation torque from drive shaft and/or motor 105 to tube 620).

Clutch 110 of FIG. 6 is implemented in accordance with clutch 110 described in conjunction with FIGS. 2 and 3. Thus, clutch 110 is engaged to allow motor 105 and gearbox 607 to rotate tube interface 630 and, thereby, tube 620. To facilitate manual operation of roller architectural covering assembly 600, clutch 110 disengages motor 105 from rotation rod 115 by momentarily reversing motor 105 after motorized operation has terminated.

In some embodiments, roller architectural covering assembly 600 includes a covering position encoder (e.g., such as covering position encoder 120 of FIG. 1) attached to an end of tube interface 630 (or to another position along tube interface 630) to track and transmit the position of the covering to controller 108. For example, a gravitational sensor may be utilized to track the number of rotations of tube 620 and, thus, the position of covering 602.

Roller architectural covering assembly 600 may be manually operated by pulling a cord attached to housing unit 605. Alternatively, roller architectural covering assembly 600 may be operated by another manual operation such as, for exemplary, turning a wand attached to a worm screw that rotates tube 620, by a user pulling or lifting covering 602, by a hand crank, etc. Additionally, roller architectural covering assembly 600 may include motor encoder 106 (e.g., such as motor encoder 106), to determine the position of covering 602 during motorized operation and track the position of motor 105 while clutch 110 disengages motor 105 from tube interface 630. For example, when motor 105 is to be disengaged from tube interface 630, motor 105 is operated in a direction opposite its previous direction of operation. When such reversed operation begins, rotation of motor 105 does not cause rotation of cam follower 220 (FIG. 2) of clutch 110 and, thus, tube 620 does not rotate/move. Accordingly, a motor encoder such as, for example, motor encoder (e.g., such as motor encoder 106), is utilized to track operation of motor 105 to determine when motor 105 has rotated elongated member 210 (FIG. 2) a sufficient distance to disengage cam follower 220 (FIG. 2) from drive gear 230 (FIG. 2) (e.g., one quarter rotation).

Roller architectural covering assembly 600 may additionally include a spring motor (e.g., such as spring motor 515, 530 of FIG. 5) or other type of brake or holding device to inhibit or resist tube 620 from rotating due to gravitational force (e.g., on covering 602) during and/or after disengagement of motor 105.

Figure 7:
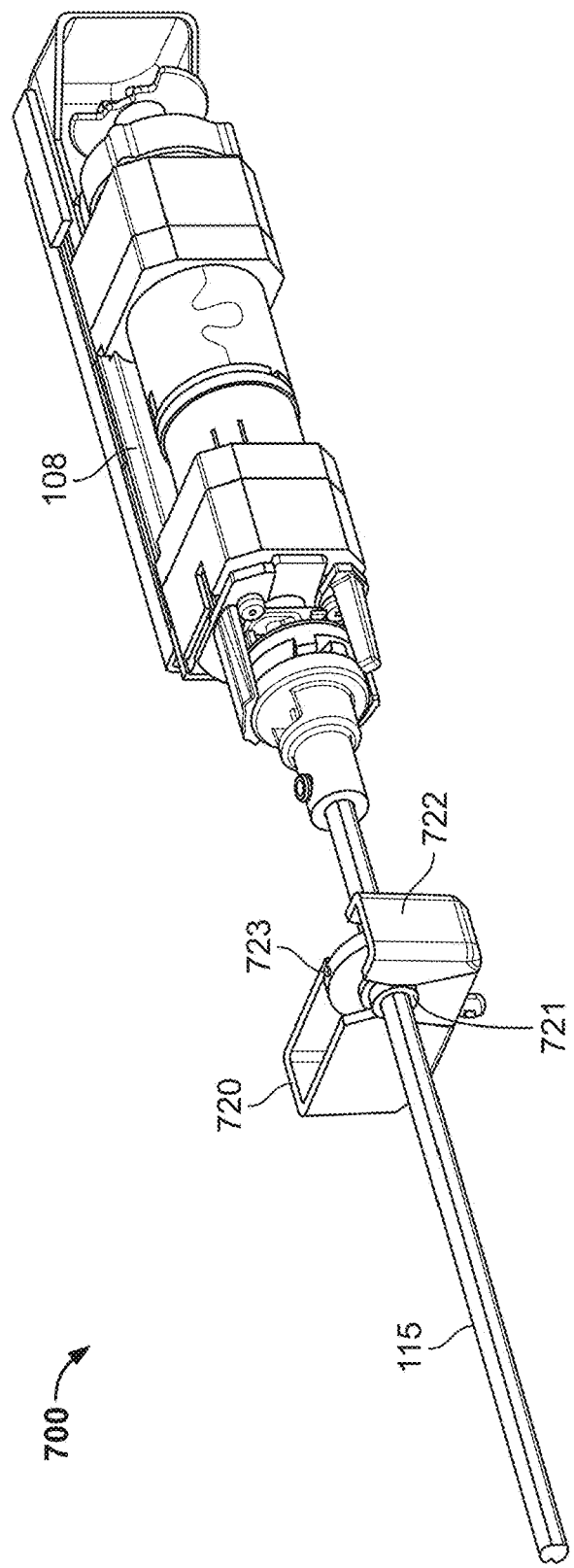
FIG. 7 illustrates an example of an analog encoder constructed in accordance with one or more principles of the disclosure and coupled with a clutch and motor structure in accordance with one or more principles of the disclosure.

FIG. 7 illustrates one example implementation of a motor assembly 700 for operating an architectural covering assembly including an example position tracking device implemented by an analog encoder 720. Motor assembly 700 includes an analog encoder 720. Analog encoder 720 comprises a housing unit 722 that remains stationary and holds a notched wheel 721 that is attached to a rotation rod 115 via a keyed hub. Notched wheel 721 rotates with the rotation of rotation rod 115. The number of rotations of rotation rod 115 can be monitored by counting the number of times that a notch 723 rotates past a sensor. Alternatively, any other characteristic could be monitored such as, for example, a magnet attached to wheel 721, a hole in wheel 721, etc. The rotation data can, for example, be transmitted to a controller 108 to track and/or determine the position of a covering moved by operation of rotation rod 115. For example, analog encoder 720 may be utilized to implement covering position encoder 120 (FIG. 1) of motorized assembly 100 of FIG. 1, may be utilized to implement covering position encoder 120 of horizontal stacking architectural covering assembly 500 of FIG. 5, may be utilized to implement a covering position encoder in roller architectural covering assembly 600 of FIG. 6, or any other type of architectural covering assembly. In order to conserve power, covering position encoder 120 may be powered down and woken up during manual operation as further described with reference to FIGS. 16 and 17.

In accordance with one aspect of the disclosure, such as to conserve power, a first position tracking device, a second position tracking device, and/or a processing device may be powered down and/or operate in a sleep mode after a timeout or during non-use of an architectural covering assembly. In accordance with this aspect, to terminate the sleep mode (e.g., to power up a controller or otherwise exit from sleep mode), an architectural covering assembly may include a processing device that updates position information based on a change in data from the first position tracking device and/or the second position tracking device. In this manner, the position data can be polled from the first and/or second position tracking devices at various points in time to track the position without providing constant power the first position tracking device, the second position tracking device, and/or the processing device. In accordance with one aspect of the disclosure, the processing device is structured to wake up and/or power up at various points in time (e.g., according to a schedule, periodically, aperiodically, etc.) to determine if the covering position has changed based on processing data from the first and/or second position tracking devices. For example, the processing device may periodically wake up, retrieve the position data, determine if the position data has changed since a previous collection of position data, return to sleep if the position data has not changed or wake up and continue tracking position data if the position data has been changed. In accordance with an additional or alternative aspect of the disclosure, the processing device is structured to wake up and/or power up based on manual movement of the covering (e.g., based on a trigger from a sensor). For example, the sensor may be triggered by movement of the covering by a component other than the motor (e.g., a manual movement, movement by another motor, etc.). The sensor may trigger the processing device to wake up. For example, the sensor may send an interrupt to the processing device and the processing device may wake up and begin tracking position data in response to the interrupt.

Figure 8:
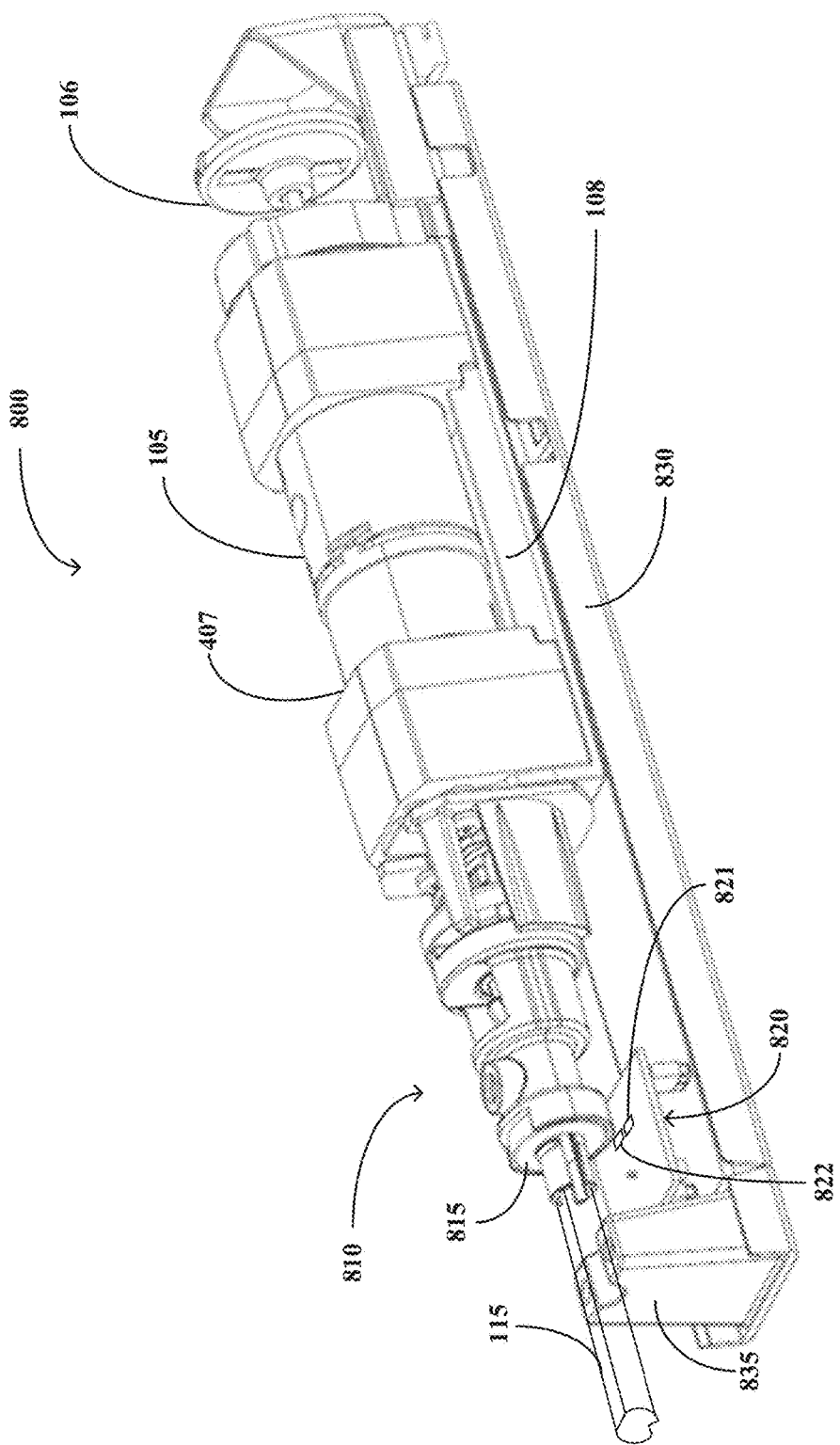
FIG. 8 illustrates an example of a motorized assembly constructed in accordance with one or more principles of this disclosure and including an engaging/disengaging clutch with rotation rod tracking to facilitate both motorized and manual operation of a device such as the architectural covering assembly of FIG. 10.

FIG. 8 illustrates an example implementation of a motorized assembly 800 for an architectural covering assembly. The example motorized assembly 800 is structured to wake from a sleep mode. Motorized assembly 800 operates in a manner similar to motorized assembly 100 of FIG. 1 except that clutch 110 and covering position encoder 120 are replaced by clutch 810, including magnet 815 and Hall effect sensor 822 for monitoring the operating position.

Motorized assembly 800 includes motor 105, torque transfer apparatus 407, motor encoder 106, and architectural covering controller 108, examples of which are described in conjunction with FIG. 1. Additionally, motorized assembly 800 includes clutch 810, magnet 815, printed circuit board (PCB) 820, reed switch 821, Hall effect sensor 822, assembly housing unit 830, and rotation rod support 835. Like clutch 110 of FIG. 1, clutch 810 is an engaging/disengaging clutch.

PCB 820 includes Hall effect sensor 822 to monitor rotation of an object (e.g., a rod) coupled to clutch 810 by monitoring rotation of magnet 815. Magnet 815 is a multi-pole magnet including a number of poles (n poles) poles around the outer circumference of magnet 815. The n poles divide magnet 815 into 360°/n sections with alternating North and South poles. When magnet 815 is not rotating, the state of reed switch 821 of PCB 820 is unchanged (e.g., in an "off" state, in an "on" state, etc.). When magnet 815 is rotated (e.g., due to manual movement of a covering or due to operation of motor 105 that drives clutch 810), the rotation causes the alternating poles of magnet 815 to pass across a sensing region of reed switch 821 and Hall effect sensor(s) 822. The pole changes interrupt/modify the state of reed switch 821 (e.g., from "on" to "off" or from "off" to "on"). The interrupt/state change of reed switch 821 is detected (e.g., by controller 108) to trigger Hall effect sensor(s) 822 to wake-up (e.g., to move from a lower power sleep state in to an operational state in which Hall effect sensor(s) 822 are energized to detect rotation of magnet 815). When operational, Hall effect sensor(s) 822 track a number of pole changes to determine rotations of magnet 815 (e.g., due to rotations of an attached rod 115) and, thereby, a position of an attached covering, as further described in conjunction with FIG. 17. In some implementations, when motor 105 is operated to drive rotation of clutch 810, Hall effect sensor(s) 822 may be additionally or alternatively be moved from a sleep state to an operation state (e.g., by controller 108) as part of operations to energize motor 105.

Hall effect sensor(s) 822 are analog Hall effect sensors that output a sine wave corresponding to the pole changes. Multiple Hall effect sensors 822 may be utilized. For example, two Hall effect sensors 822 may be utilized to track a direction of rotation of magnet 815. In some examples, two Hall effect sensors 822 are separated by 90°. The separation between two Hall effect sensors 822 creates a phase lead/lag in the outputted sine waves associated with the separated Hall effect sensors 822 during rotation of magnet 815. The direction of rotation of magnet 815 and, thereby, an object coupled to clutch 810 is determined based on which Hall effect sensor's 822 output phase angle is leading/lagging. For example, a leading phase of a first Hall effect sensor 822 may correspond with clockwise rotation and a leading phase of a second Hall effect sensor 822 may correspond with counter-clockwise rotation. Additionally or alternatively, a single Hall effect sensor with multiple Hall elements (e.g., two Hall elements) may be used.

In some examples, Hall effect sensor(s) 822 are analog Hall effect sensors to calculate a precise angle of rotation (e.g., within 1-degree or better resolution). Analog Hall effect sensor(s) 822 consistently output a steady signal in the absence of a magnetic field to avoid reporting false changes in position after being triggered by reed switch 821. When analog Hall effect sensors 822 are used, an analog-to-digital converter may determine an angle of rotation based on the output of the analog Hall effect sensors 822. For example, the output of the first Hall effect sensor may be represented as $A = K_A \sin(\theta) + E_{OFFSETA}$, where $K_A$ is some multiplier (e.g., max voltage divided by two), $\theta$ is the angle of rotation, and $E_{OFFSETA}$ is an error associated with the first Hall effect sensor. Additionally, the output of the second Hall effect sensor may be represented as $B = K_B \cos(\theta - E_\omega) + E_{OFFSETB}$, where $K_B$ is some multiplier (e.g., max voltage divided by two), $\theta$ is the angle of rotation, $E_{OFFSETB}$ is an error associated with the first Hall effect sensor, and $E_\omega$ is the angle between the two Hall effect sensors. Using trigonometric identities, the angle of rotation can be determined based on $$\theta = \arctan\left(\frac{KA\sin(\theta) + EOFFSETA}{KB\cos(\theta - E\omega) + EOFFSETB}\right).$$

The error angle between the Hall effect sensors 822 may be eliminated to simplify the computation. In two-argument form, the angle of magnet 815 may be calculated according to Equation 1:

$$a\tan2(B, A) = \qquad \text{(Equation 1)}$$

$$\begin{cases} \arctan\left(\dfrac{A}{B}\right) & \text{if } B \geq 0 \text{ and } |A| < |B| \\ \dfrac{\pi}{2} - \arctan\left(\dfrac{A}{B}\right) & \text{if } A \geq 0 \text{ and } |A| \geq |B| \\ \pi + \arctan\left(\dfrac{A}{B}\right) & \text{if } A \geq 0 \text{ and } B < 0 \text{ and } |A| < |B| \\ -\pi + \arctan\left(\dfrac{A}{B}\right) & \text{if } A < 0 \text{ and } B < 0 \text{ and } |A| < |B| \\ -\dfrac{\pi}{2} - \arctan\left(\dfrac{A}{B}\right) & \text{if } A < 0 \text{ and } |A| \geq |B| \end{cases}$$

Using Equation 1, the angle of rotation is determined using integer arithmetic instead of floating-point arithmetic (e.g., the rotation angle is determined by controller 108). Thus, $$\frac{\sin(\theta)}{\cos(\theta)}$$

(e.g., a quotient) can be calculated in a fixed-point format defined as $$q(a, b) = \frac{2^n a}{b},$$

where a and b are twos-complement integers. The fixed-point format is implemented as a twos-complement integer of at least m+1 bits representing a range of $-1 \leq q < 1$. Additionally, the arctan function may be computed using a look-up table with $2^{m+1}$ entries and can be indexed by adding $2^m$ to the quotient.

PCB 820 communicatively couples reed switch 821 and Hall effect sensor(s) 822 to a controller (e.g., architectural covering controller 108 of FIG. 11) via a wire and/or cable housed in assembly housing unit 830. PCB 820 receives power from a battery(ies), a battery pack(s), an AC power source, a DC power source, etc. Additionally or alternatively, PCB 820 may receive power from architectural covering controller 108 via a wire housed in assembly housing unit 830.

Assembly housing unit 830 houses components of motorized assembly 800 (e.g., to form a motorization modular unit). In some examples, assembly housing unit 830 also includes wired connections to communicatively couple PCB 820, architectural covering controller 108, motor 105, etc. Assembly housing unit 830 may additionally house a wire, cable, etc. that couples the motorized assembly 800 with a power source. As previously described, the power source may be a battery(ies), a battery pack(s), an AC power source, or a DC power source. Alternatively, the power source may be included in assembly housing unit 830 (e.g., battery(ies) located in housing unit 830). Assembly housing unit 830 additionally includes rotation rod support 835 to support a rod or other driver (e.g., rotation rod 115) coupled with clutch 810.

Figure 9:
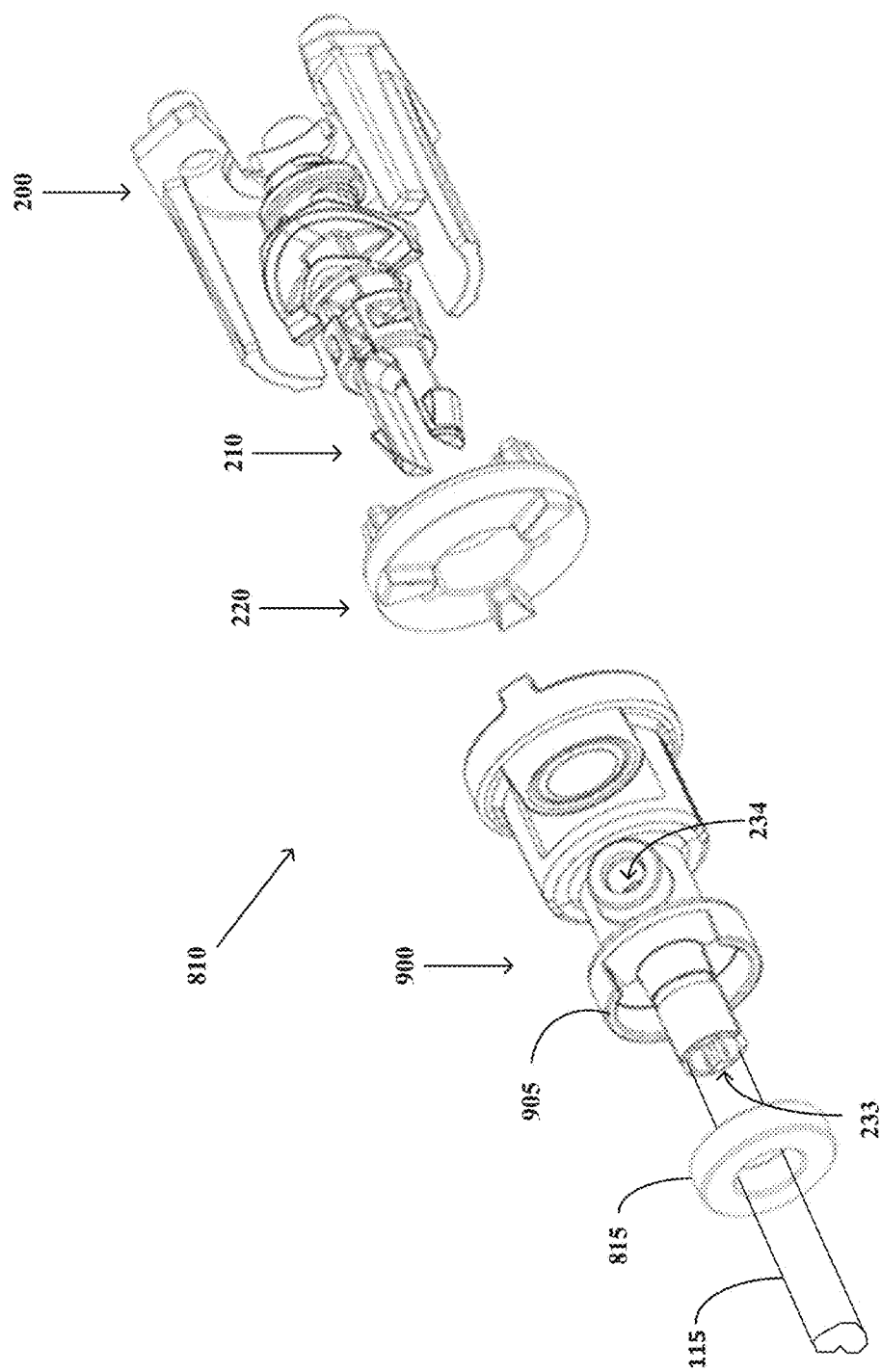
FIG. 9 illustrates an example of an implementation of an engaging/disengaging clutch that may be used to implement the clutch of FIG. 8.

FIG. 9 illustrates an example implementation of clutch 810 of FIG. 8. Clutch 810 of FIG. 9 is described with reference to motorized assembly 800 of FIG. 8. Alternatively, clutch 810 of FIG. 9 may be utilized with any other motorization assembly or other type of assembly that is to be selectively engaged with rod 115 or other drive element (e.g., vertical architectural covering assembly 400 of FIG. 4, horizontal stacking architectural covering assembly 500 of FIG. 5, roller architectural covering assembly 600 of FIG. 6, or any type of covering assembly).

Clutch 810 of FIG. 9 includes clutch housing unit 200, elongated member 210, cam follower 220, and drive gear 900. Clutch housing unit 200, elongated member 210, and cam follower 220 are described in detail in conjunction with FIG. 2.

Drive gear 900 of FIG. 9 includes keyed hub 233 to receive rotation rod 115 and to couple rotation rod 115 to clutch 810. Drive gear 900 includes hole 234 through which a set screw to couple drive gear 900 with rotation rod 115. Drive gear 900 includes magnet housing 905 to carry magnet 815. Magnet 815 is coupled in magnet housing 905 to rotate with rotation of drive gear 900 (e.g., magnet 815 may be affixed with adhesive, friction fitting within magnet housing 905, etc.). Because drive gear 900 preferably is fixedly coupled to rotation rod 115, drive gear 900 and magnet 815 rotate with rotation of rotation rod 115. Thus, as described in conjunction with FIG. 8, Hall effect sensor(s) 822 may track rotation of rotation rod 115 based on the magnetic field associated with magnet 815. The rotation is tracked when rotation rod 115 is rotated by manual movement (e.g., manual movement of a covering by a user while a motor is not energized) or is rotated by a motor.

As previously described in connection with clutch 110 of FIGS. 2 and 3, rotation of elongated member 210 pushes cam follower 220 toward drive gear 900 to engage clutch 810 (e.g., to engage motor 105 with rotation rod 115). To disengage clutch 810 (e.g., to disengage motor 105 from rotation rod 115), elongated member 210 is rotated in a direction opposite the previous rotation for a partial turn (e.g., one quarter rotation), which moves cam follower 220 away from drive gear 900.

FIG. 10 illustrates a vertical stacking architectural covering assembly 1000 that includes motorized assembly 800. Vertical stacking architectural covering assembly 1000 includes motor 105 coupled to torque transfer apparatus 407, motor encoder 106, architectural covering controller 108, rotation rod 115, translational gearbox 425, moving rail assembly 430, shade drive mechanism 435, and covering 440. Vertical stacking architectural covering assembly 1000 further includes clutch 810, PCB 820, and assembly housing unit 830. Covering 440 is attached to moving rail assembly 430 to selectively cover an architectural structure, to provide shading, privacy, etc. As described in conjunction with FIG. 8, assembly housing unit 830 houses motor 105, motor encoder 106, architectural covering controller 108, torque transfer apparatus 407, clutch 810, and PCB 820.

As shade drive mechanism 435 is moved, moving rail assembly 430, which is attached to shade drive mechanism 435, slides vertically across an architectural structure to move covering 440 to cover or to uncover the architectural structure. Moving rail assembly 430 is moved manually without a motor (e.g., by a user pulling covering 440, by a user pulling a cord, rod, etc. attached to covering 440 and/or moving rail assembly 430, etc.) and/or by driving shade drive mechanism 435 with motor 105. Operating motor 105 causes engagement of clutch 810 and rotation of rotation rod 115 causing moving rail assembly 430 to move via translation gearbox 425. After motorized operation is completed, motor 105 is disengaged, such as by reversing motor 105 (e.g., for a quarter rotation of clutch 810) to disengage clutch 810 and allow for manual operation that does not apply torque on motor 105.

As described in conjunction with FIG. 8, rotation of rotation rod 115 (e.g., due to manual movement or motorized movement by motor 105) is tracked by Hall effect sensor(s) 822 (FIG. 8) of PCB 820. The Hall effect sensor(s) 822 track magnetic pole changes associated with rotation of magnet 815 (FIG. 8) included in clutch 810. PCB 820 also includes reed switch 821 (FIG. 8) to activate Hall effect sensor(s) 822 when rotation rod 115 is rotated due to manual movement of moving rail assembly 430 (e.g., Hall effect sensor(s) 822 may be moved to a low power state when motor 105 is not operated and when reed switch 821 is not triggered by rotation of magnet 815). Motor 105, architectural covering controller 108, motor encoder 106, and/or PCB 820 may be powered by a battery(ies), a battery pack(s), an AC power source, or a DC power source.

In accordance with an aspect of the disclosure, to control operation of a motor and/or track position of a covering, an architectural covering assembly includes a controller. In some aspects, the controller collects position information from position tracking device(s) included in the architectural covering assembly. In some aspects, the controller instructs movement of the motor based on the position information to move the covering to a desired position (e.g., an upper limit, a lower limit, an intermediate position, etc.). In some aspects, the controller transitions to a sleep mode after a period of non-use of the architectural covering assembly to conserve power. In some aspects of the disclosure, the controller wakes from the sleep periodically or aperiodically to check if position data from the position tracking device(s) has changed. In such an aspect, when position data has changed, the controller remains awake and continues tracking a position of the covering based on the position data. When position data has not changed, the controller returns to sleep mode. In accordance with one aspect of the disclosure, a sensor may be included to detect movement of the covering (e.g., manually driven movement) and to trigger the controller to wake to continue tracking the position of the covering.

Figure 11:
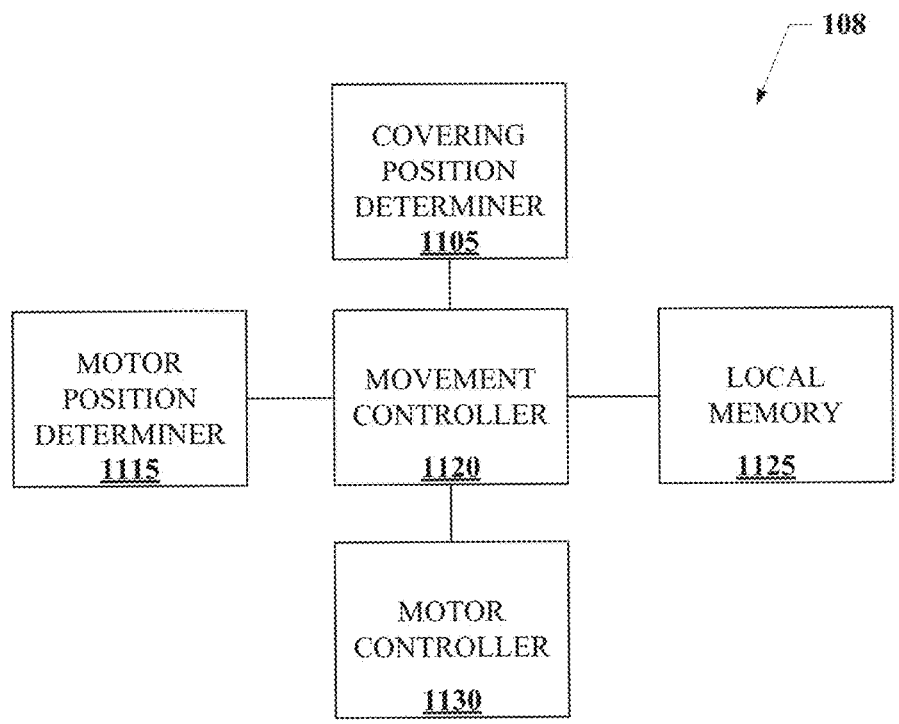
FIG. 11 is a block diagram of an architectural covering controller constructed in accordance with one or more principles of the disclosure to control an architectural covering in accordance with the disclosure.

FIG. 11 is a block diagram of an example of an implementation of architectural covering controller 108 of motorized assembly 100 of FIG. 1. Although architectural covering controller 108 of FIG. 11 is described in conjunction with motorized assembly 100 of FIG. 1, architectural covering controller 108 of FIG. 11 may be utilized to control operation of any other architectural covering assembly such as, for example, the architectural covering assemblies described in conjunction with FIGS. 12-17.

In the illustrated embodiment of FIG. 11, architectural covering controller 108 includes covering position determiner 1105, motor position determiner 1115, movement controller 1120, memory 1125, and motor controller 1130.

Covering position determiner 1105 receives information from covering position encoder 120 of FIG. 1 and determines a position of the covering. With reference to the embodiment of FIG. 1, covering position determiner 1105 determines the position of the covering by translating information about which of the resistive contact(s) 124 are in contact with slider 122 of covering position encoder 120 of FIG. 1. However, it will be appreciated that the position of the covering may be determined in other manners as well, as described herein, and in manners known to those of ordinary skill in the art. The position of the covering is determined as a position between operating limits of the covering and/or operating limits of covering position encoder 120. For example, the position may be determined as a previously stored position, a fully opened position, a fully closed position, a lower limit position, an upper limit position, and/or any other reference position. Covering position determiner 1105 transmits the position information to movement controller 1120 for processing and/or storage in local memory 1125.

Motor position determiner 1115 of FIG. 11 determines motor position information (e.g., voltages corresponding to a position of motor 105 of FIG. 1). For example, the motor position determiner 1115 of the illustrated embodiments includes a rotary encoder that tracks rotation of the output of motor 105 to determine how many revolutions (or portions of a revolution) motor 105 has operated. Alternatively, motor position determiner 1115 may monitor the operating time of motor 105 to monitor the position and/or revolutions of output of motor 105 (e.g., using the operating time and the operating speed (revolutions per minute)). Additionally or alternatively, any type of encoder may be utilized such as, for exemplary, a gravitational sensor may be attached to an output of motor 105 to monitor a position and/or revolutions of the output of motor 105.

Movement controller 1120 of the illustrated embodiment of FIG. 11 receives instructions from an operator to move the covering to an opened position and/or a closed position. Movement controller 1120 may receive instructions from a central control (e.g., a building control). Additionally or alternatively, movement controller 1120 may receive instructions from inputs (e.g., a remote control, input buttons, etc.) associated with motorized assembly 100.

When commanded to operate motorized assembly 100, movement controller 1120 instructs motor controller 1130 to drive motor 105. Movement controller 1120 monitors the movement of the covering via the information received from covering position determiner 1105 and/or motor position determiner 1115 to determine when the covering has reached the position commanded by the input to movement controller 1120 (e.g., a preset limit position, a fully opened position, a fully closed position). Alternatively, movement controller 1120 may command motor controller 1130 to continue driving motor 105 until the input stops (e.g., until a held push button input is no longer held). Once the desired position for the covering is reached (or movement controller 1120 otherwise determines that motorized operation is to terminate), movement controller 1120 instructs motor controller 1130 to operate motor 105 briefly in a direction opposite the previous direction of operation (e.g., if the previous operation was clockwise, movement controller 1120 instructs motor controller 1130 to operate motor 105 in a counterclockwise direction). According to the illustrated embodiments, during this brief reverse operation of motor 105, movement controller 1120 monitors the rotation of motor 105 using the information received from motor position determiner 1115 to precisely control motor 105 to rotate elongated member 210 of clutch 110 a partial revolution (e.g., one quarter revolution) to disengage motor 105 via clutch 110. Movement controller 1120 disengages motor 105 to allow motorized assembly 100 to be manually operated without forcing the movement of motor 105.

Memory 1125 of FIG. 11 stores information utilized for operation of architectural covering controller 108. Memory 1125 stores a current position of the covering determined by movement controller 1120 based on information received from covering position determiner 1105, a position of motor 105 based on information received from motor position determiner 1115, a previous and/or current operating direction for motor 105 based on information received from motor position determiner 1115, and/or preset limit positions for the covering. Memory 1125 also stores operating parameters for motorized assembly 100 such as, for example, an indication of a direction of motor 105 that the covering to open, a direction of motor 105 that causes the covering to close, a fraction and/or number of revolutions of motor 105 that cause clutch 110 to disengage motor 105 from rotation rod 115, and a table translating or correlating positions of the slider of covering position encoder 120 to positions of the covering. Memory 1125 may additionally or alternatively store any other operating information and/or parameters for architectural covering controller 108. Memory 1125 may be any type of storage memory such as random access memory, read only memory, flash memory, disk storage etc. Alternatively, local memory 1125 may be a central memory that is shared by multiple ones of motorized assembly 100 (e.g., memory provided by a building controller communicatively coupled to motorized assembly 100).

Motor controller 1130 sends signals to motor 105 to cause motor 105 to operate in accordance with commands/instructions from movement controller 1120. Motor controller 1130 is a motor control system that operates motor 105 at a desired speed and for a desired duration. Motor controller 1130 may additionally or alternatively include a speed controller (e.g., a pulse width modulation speed controller), a brake, and/or any other component for operating motor 105. In some embodiments, motor controller 1130 controls a supply of voltage to motor 105 to regulate the speed of motor 105.

While a manner of implementing architectural covering controller 108 of FIG. 1 is illustrated in FIG. 11, one or more of the elements, processes, and/or devices illustrated in FIG. 11 may be combined, divided, re-arranged, omitted, eliminated, and/or implemented in any other way. Further, covering position determiner 1105, motor position determiner 1115, movement controller 1120, motor controller 1130, memory 1125, and/or, more generally, architectural covering controller 108 of FIG. 11, may be implemented by hardware, software, firmware, and/or any combination of hardware, software, and/or firmware. Thus, for example, any of covering position determiner 1105, motor position determiner 1115, covering position determiner 1105, movement controller 1120, motor controller 1130, memory 1125, and/or, more generally, architectural covering controller 108 of FIG. 11 could be implemented by one or more analog or digital circuit(s), logic circuit(s), programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of covering position determiner 1105, motor position determiner 1115, movement controller 1120, motor controller 1130, memory 1125, and/or, more generally, architectural covering controller 108 of FIG. 11 is/are hereby expressly defined to include a tangible computer readable storage device or storage disk such as a memory, a digital versatile disk (DVD), a compact disk (CD), a Blu-ray disk, etc. storing the software and/or firmware. Further still, architectural covering controller 108 of FIG. 11 may include one or more elements, processes and/or devices in addition to, or instead of, those illustrated in FIG. 11, and/or may include more than one of any or all of the illustrated elements, processes, and devices.

Flowcharts representative of machine readable instructions for implementing architectural covering controller 108 of FIGS. 1, 4, 6, 7, 8, 10 and/or 11 are shown in FIGS. 12-17. In these embodiments, the machine readable instructions comprise one or more programs for execution by a processor such as processor 1812 shown in processor platform 1800 discussed below in connection with FIG. 18. The program(s) may be embodied in software stored on a tangible computer readable storage medium such as a CD-ROM, a floppy disk, a hard drive, a digital versatile disk (DVD), a Blu-ray disk, or a memory associated with processor 1812, but the entire program(s) and/or parts thereof could alternatively be executed by a device other than processor 1812 and/or embodied in firmware or dedicated hardware. Further, although the program(s) is described with reference to the flowcharts illustrated in FIGS. 12-17, many other methods of implementing architectural covering controller 108 of FIGS. 1, 4, 6, 7, 8, 10, and/or 11 may alternatively be used. For example, the order of execution of the blocks may be changed, and/or some of the blocks described may be changed, eliminated, or combined.

As mentioned above, the processes of FIGS. 12-17 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the processes of FIGS. 12-17 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 12-17 are described in conjunction with elements of motorized assembly 100 of FIG. 1. Alternatively, the machine readable instructions represented by the flowcharts illustrated by FIGS. 12-17 may be utilized to control operation of any other type of architectural covering assembly or other assembly in which motorized operation with an engaging/disengaging clutch is utilized (e.g., the architectural covering assemblies described in conjunction with FIGS. 4-6 and 10).

Figure 12:
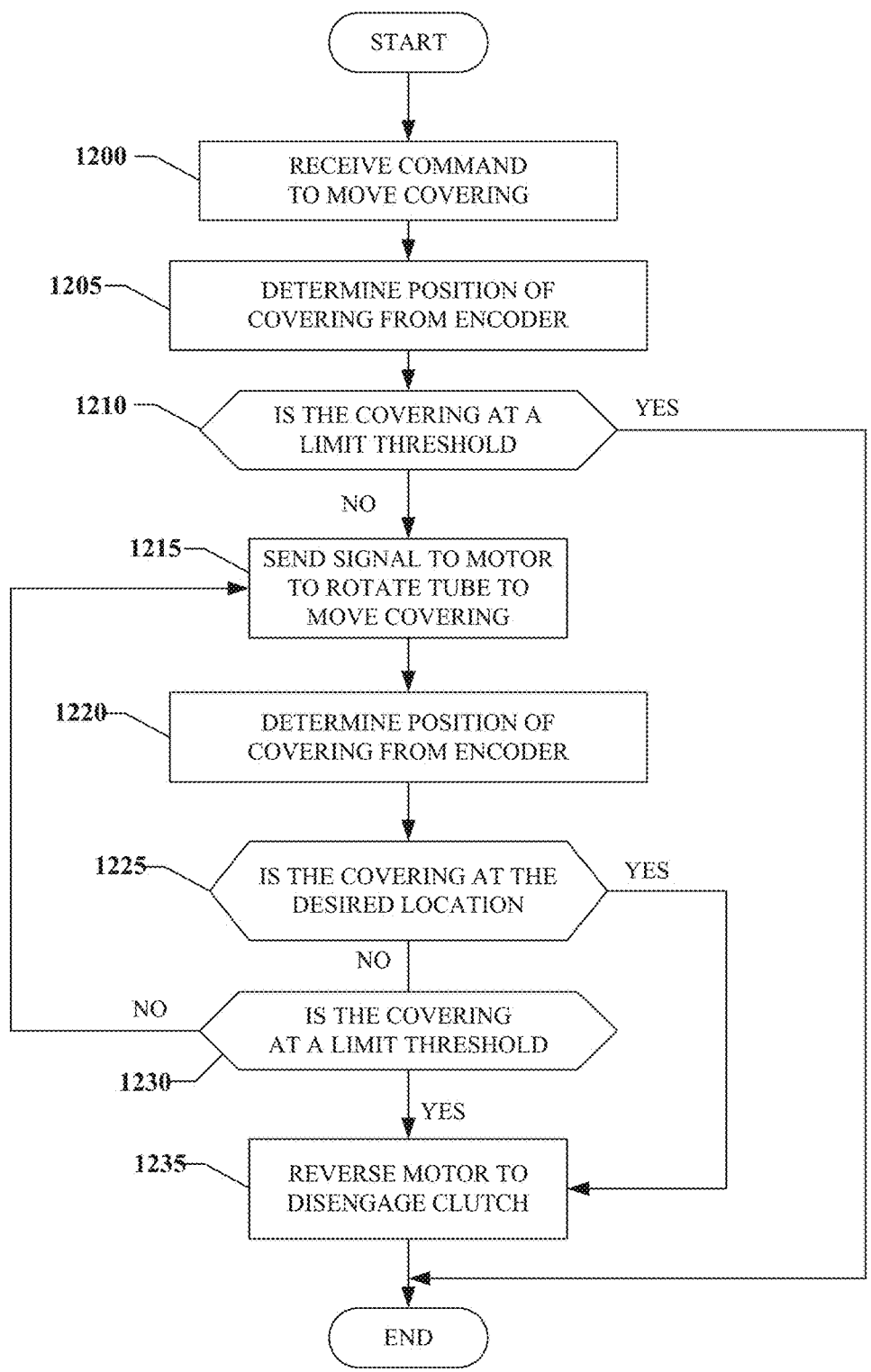
FIGS. 12, 13, 14, and 15 are flowcharts representative of machine readable instructions structured in accordance with one or more principles of this disclosure and which may be executed to implement the architectural covering controller of FIG. 11.

FIG. 12 is a flowchart representative of machine readable instructions that may be executed to open or close motorized assembly 100 of FIG. 1.

At block 1200, movement controller 1120 of architectural covering controller 108 receives an instruction to move the covering of motorized assembly 100. For example, movement controller 1120 may receive an instruction from a wireless remote control via a wireless receiver included in architectural covering controller 108, from a wired remote control, from a button on a control panel, from a central controller, etc. At block 1205, in response to the instruction, movement controller 1120 determines the position of the covering from covering position encoder 120. For example, movement controller 1120 may determine the position based on information currently transmitted by covering position encoder 120 and/or by retrieving previously stored position information from local memory 1125. Alternatively, movement controller 1120 may determine the position of the covering based on rotation information received from motor position determiner 1115 and/or by retrieving previously stored rotation information from local memory 1125.

At block 1210, movement controller 1120 then determines if the covering is at a limit threshold. For example, movement controller 1120 determines if the covering is at a fully closed position when movement controller 1120 is being instructed to move to the closed position and/or determines if the covering is at a fully open position when movement controller 1120 is being instructed to move to the open position. If the covering is at a limit threshold, the process of FIG. 12 terminates because, based on the information received by movement controller 1120, the instruction cannot be executed without possibly damaging motorized assembly 100. In some embodiments, the covering may not actually be at the limit threshold (e.g., where covering position encoder 120 has been damaged or lost calibration). In such instances, motorized assembly 100 and/or covering position encoder 120 can be repaired and/or re-calibrated prior to further operation.

If, at block 1210, movement controller 1120 determines that the covering is not at a limit threshold, movement controller 1120 of FIG. 11 instructs, at block 1215, motor controller 1130 to drive motor 105 in a direction based on the commanded operation (e.g., closing the covering of motorized assembly 100, opening the covering of motorized assembly 100, moving to a preset position, etc.). According to the illustrated embodiment, as the output of motor 105 operates, elongated member 210 of clutch 110 rotates, causing cam follower 220 to engage drive gear 230, which causes rotation rod 115 to rotate to move the covering.

At block 1220, movement controller 1120 monitors the position of the covering using information from covering position determiner 1105 and/or motor position determiner 1115 based on information from covering position encoder 120 and/or motor encoder 106 to determine if the covering is at the desired position (e.g., the position commanded by input to movement controller 1120). If the covering is at the desired location, the process proceeds to block 1225 to disengage motor 105 via clutch 110.

At block 1230, if movement controller 1120 determines that the covering is not at the desired position (or movement controller 1120 continues to instruct the movement of the covering), movement controller 1120 determines if the covering is at a limit threshold. If the covering is not at a limit threshold, control returns to block 1215 to continue rotating rotation rod 115 to continue moving the covering.

At block 1235, after determining that the covering is at a desired location, the covering is at a limit threshold, or the movement of the covering is to terminate for any other reason, movement controller 1120 instructs motor controller 1130 to temporarily rotate motor 105 in a reverse direction (e.g., a reverse direction from the direction used to move the covering) to disengage motor 105 from rotation rod 115 via clutch 110. The process of FIG. 12 then terminates. A process for implementing block 1235 to disengage motor 105 from rotation rod 115 via clutch 110 is illustrated in FIG. 13.

Figure 13:
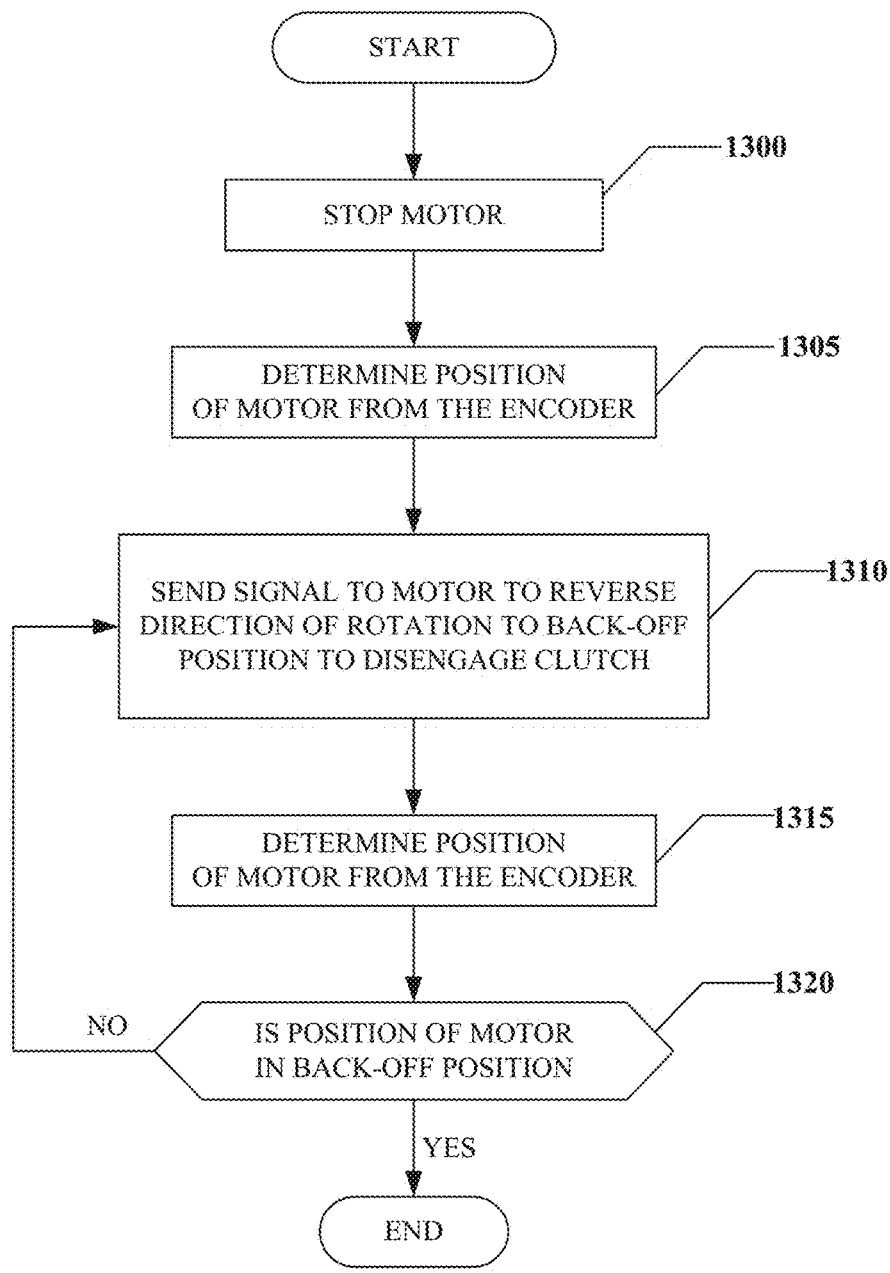

The process of FIG. 13 begins when movement controller 1120 determines that motorized operation of motorized assembly 100 is to terminate (e.g., at block 1235 and/or at block 1235 of FIG. 12). Alternatively, movement controller 1120 may receive an instruction to terminate motorized operation from a wireless remote control via a wireless receiver included in the controller, from a wired remote control, from a button on a control panel, from a central controller, from a safety sensor, etc.

At block 1300, in response to the instruction and/or determination that motorized operation is to terminate, movement controller 1120 instructs motor controller 1130 to stop driving motor 105. At this point, motor 105 is still engaged to rotation rod 115 via clutch 110. While motor 105 is engaged, manual operation of motorized assembly 100 will apply torque to the output shaft of motor 105.

At block 1305, movement controller 1120 determines the current rotational position of motor 105 from motor position determiner 1115. For example, motor position determiner 1115 may indicate the current position of motor 105 in degrees from a zero position based on information received from motor encoder 106. At block 1310, once the position of motor 105 is determined, movement controller 1120 instructs motor controller 1130 to drive motor 105 in a reverse direction (e.g., a direction opposite the direction previously used to move the covering). While motor 105 is rotating in the reverse direction, a braking element (e.g., a brake, a spring motor, etc.) may be utilized to resist rotation rod 115 from moving (e.g., rotating due to gravitational force) and/or resisting disengagement of motor 105.

At block 1315, movement controller 1120 then determines the position of motor 105 via motor position determiner 1115. Movement controller 1120 determines if motor 105 has rotated far enough to disengage motor 105 via clutch 110. At block 1320, movement controller 1120 determines if the position of motor 105 is in a back-off position (e.g., disengaged position). For example, movement controller 1120 may determine if the position of motor 105 is in a back-off position when motor 105 has rotated far enough to rotate elongated member 210 of clutch 110 of FIGS. 2, 3, and 9 to a position at which cammed surface 214 allows cam follower 220 to move away from drive gear 230 to disengage cam follower 220 from keyed surface 224 of drive gear 230. For example, according to the illustrated embodiments of FIGS. 2, 3, and 9, after clutch 110 has been engaged (e.g., cam follower knobs 322 have been driven against a stop 216), cam follower 220 is disengaged from drive gear 230 by rotating elongated member a partial (e.g., one quarter) revolution. If movement controller 1120 determines that motor 105 has not rotated a sufficient amount to disengage motor 105 via clutch 110, control returns to block 1310 to continue driving the motor. If movement controller 1120 determines that motor 105 has rotated elongated member 210 to a position that disengages motor 105 via clutch 110, the process of FIG. 13 terminates and motor 105 is disengaged from rotation rod 115.

Figure 14:
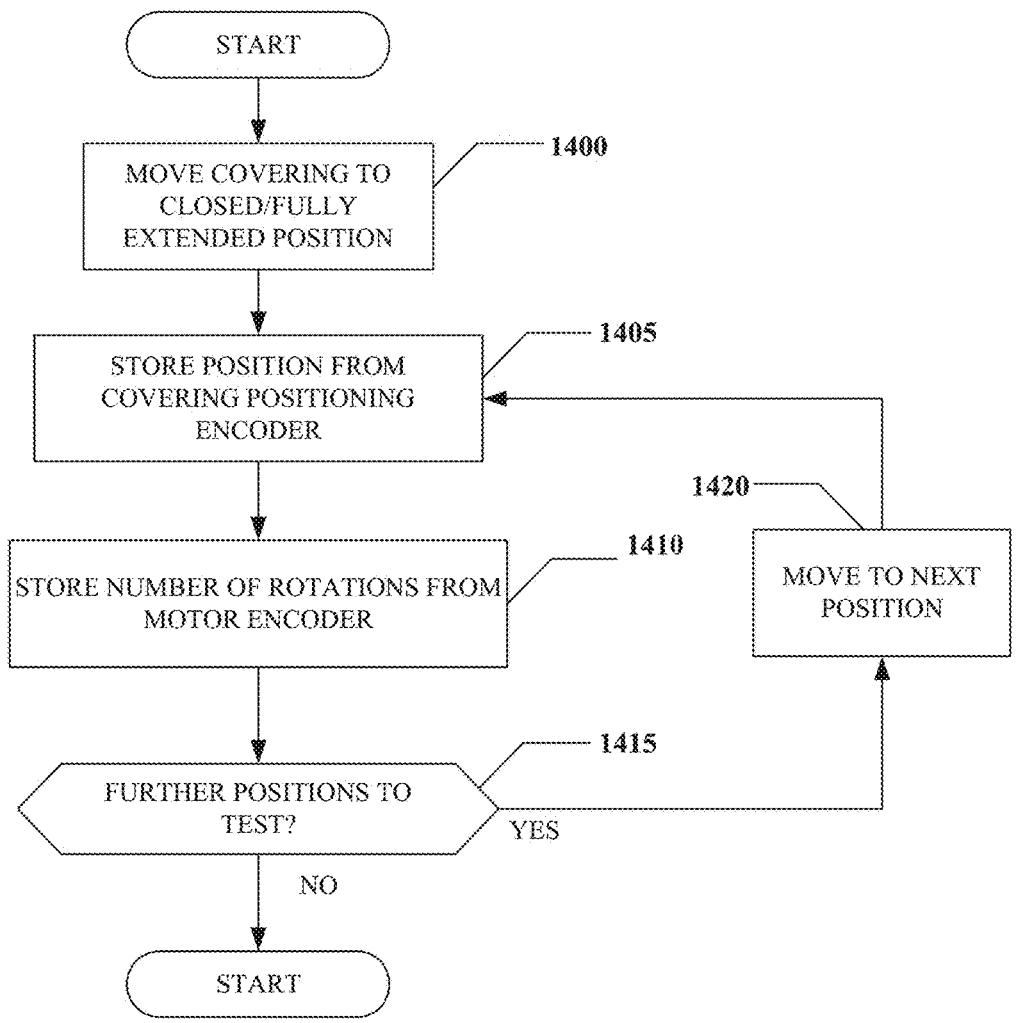

FIG. 14 is a flowchart representative of example machine readable instructions that may be executed to implement architectural covering controller 108 of FIGS. 1, 4, 6, 7, 8, 10, and/or 11 to calibrate and/or recalibrate covering position encoder 120 and motor encoder 106 of FIG. 1. For example, the process of FIG. 14 may be performed continuously, periodically, and/or aperiodically to calibrate/correlate readings reported by the two encoders 120, 106.

At block 1400, movement controller 1120 of FIG. 11 instructs motor controller 1130 to drive motor 105 to move a covering to a first reference position. In this example, movement controller 1120 instructs motor controller 1130 to drive motor 105 to a fully closed position as indicated by covering position encoder 120 (covering position encoder 120 does not lose position when, for example, power is lost). Alternatively, motor 105 may be driven to a fully open position or any other reference position.

At block 1405, covering position determiner 1105 stores the position of the covering as indicated by covering position encoder 120 as a first reference position (e.g., a zero point) in local memory 1125. For example, covering position encoder 120 reports a position as a voltage value from a potentiometer of the covering position encoder 120. At block 1410, motor position determiner 1115 stores the position of the covering as indicated by motor encoder 106 as a first reference position (e.g., a zero point) in local memory 1125. For example, the motor position determiner 1115 determines the covering position as a number of rotations from a reference position (e.g., the fully closed position may be established as the zero reference position).

At block 1415, movement controller 1120 determines if there are further positions to be evaluated. If there are further positions to be evaluated, at block 1420, the movement controller 1120 instructs motor control 1130 to drive motor 105 to move the covering to the next position as indicated by the example covering position determiner 1105 and control returns to block 1405 to store position information in the lookup table in local memory 1125.

If there are no further positions to be evaluated, the process of FIG. 14 terminates with the lookup table stored in local memory 1125.

Accordingly, by the process of FIG. 14 movement controller 1120 may associate and/or create a lookup table correlating any number of position values reported by encoders 120, 106. For example, the following lookup table may be generated:

| Voltage Read from Covering Position Encoder | Number of Motor Rotations from Zero Point | Percentage Covered |
| --- | --- | --- |
| 0.5 V | 0 | 100% |
| 0.52 V | 1 | 99.5% |
| 0.54 V | 2 | 99% |
| .4.88 V | 199 | 0.5% |
| 5 V | 200 (Hundred Point) | 0% |

The data from the association and/or look-up data may be used to calibrate the two encoders, determine where the covering is positioned based on a value reported by either encoder, and/or determine how far a covering needs to move to reach a desired location.

Figure 15:
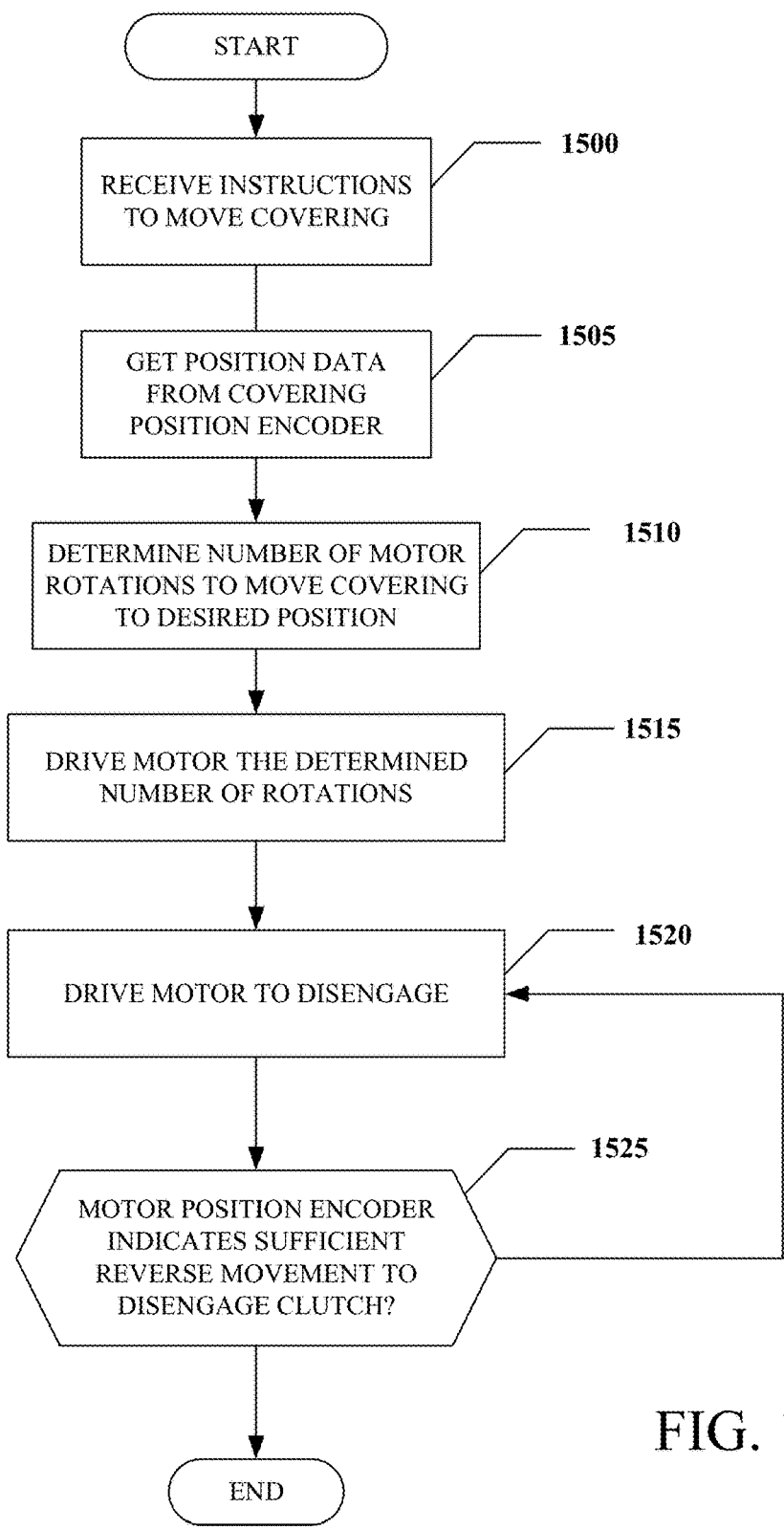

FIG. 15 is a flowchart representative of machine readable instructions that may be executed to implement architectural covering controller 108 of FIGS. 1, 4, 6, 7, 8, 10, and/or 11 to move a covering of an architectural covering assembly using covering position determiner 1105 and motor position determiner 1115 of FIG. 11.

At block 1500, movement controller 1120, receiving instructions to move a covering to a desired position. The instructions may be sent from a user or may be automated instructions (e.g., instructions to automatically move the covering at a set time, a set amount of light, etc.). At block 1505, movement controller 1120 receives a position of the example covering from covering position determiner 1105. Even if the covering was previously manually changed (e.g., while motor 105 was disengaged), the position reported by covering position determiner 1105 is accurate because covering position encoder 120 continues to track the movement of the covering during manual and/or motorized movement.

At block 1510, once the position of the covering has been determined, movement controller 1120 determines a number of rotations required to move the covering to the desired position based on the current position of the covering. For example, movement controller 1120 determines a number of rotations by accessing the lookup table stored in local memory 1125. At block 1515, movement controller 1120 instructs motor controller 1130 to drive motor 105 the determined number of rotations to move the covering to the desired position. Alternatively, covering position determiner 1105 may poll covering position encoder 120 while motor 105 is being driven until the desired location has been reached. In this manner, movement controller 1120 does not need to use motor position determiner 1115 to drive the covering to the desired location.

Additionally, once the covering has moved to the desired position, movement controller 1120 may obtain covering position information from covering position determiner 1105. In this manner, movement controller 1120 can perform error analysis. For example, if the position from covering position determiner 1105 does not match the desired position, movement controller 1120 may determine that an error has occurred. An error may occur if rotation of motor 105 is no longer moving the covering, covering position encoder 120 is jammed, covering position encoder 120 is no longer accurately tracking the covering position, voltages associated with covering position encoder 120 positions change (e.g., due to changes in time, temperature, operating voltage, etc.), motor encoder 106 is no longer accurately tracking movement of motor 105, and/or any other electrical, mechanical, and/or software error. Movement controller 1120 may flag the error, identify the error to a user (e.g., output a notification such as an audible alert), and/or recalibrate covering position encoder 120 and motor encoder 106, as described in FIG. 14.

At block 1520, after driving the covering to a desired position, movement controller 1120 instructs motor controller 1130 to disengage motor 105 from driving element 115. In some embodiments, movement controller 1120 instructs motor controller 1130 to disengage motor 105 by driving motor 105 in a reverse direction (e.g., a direction opposite the previously operated direction). At block 1525, movement controller 1120 receives rotation position information from motor position determiner 1115 to determine if motor 105 has operated a sufficient distance and/or for a sufficient amount of time and/or rotations to disengage motor 105 via clutch 110. For example, when reversing motor 105 to disengage motor 105 via clutch 110, covering position encoder 120 may not be moved, but motor encoder 106 will continue to detect the rotations of motor 105 (e.g., by monitoring an output of a torque transfer apparatus). When movement controller 1120 determines from motor position determiner 1115 that motor 105 has not moved a sufficient distance to disengage motor 105 via clutch 110, control returns to block 1520 to continue operating motor 105.

When movement controller 1120 determines from motor position determiner 1115 that motor 105 has moved a sufficient distance to disengage clutch 110, the process of FIG. 15 terminates. In other words, clutch 110 is disengaged, which disengages motor 105 so that the covering can be manually moved without forcing rotation of motor 105.

Figure 16:
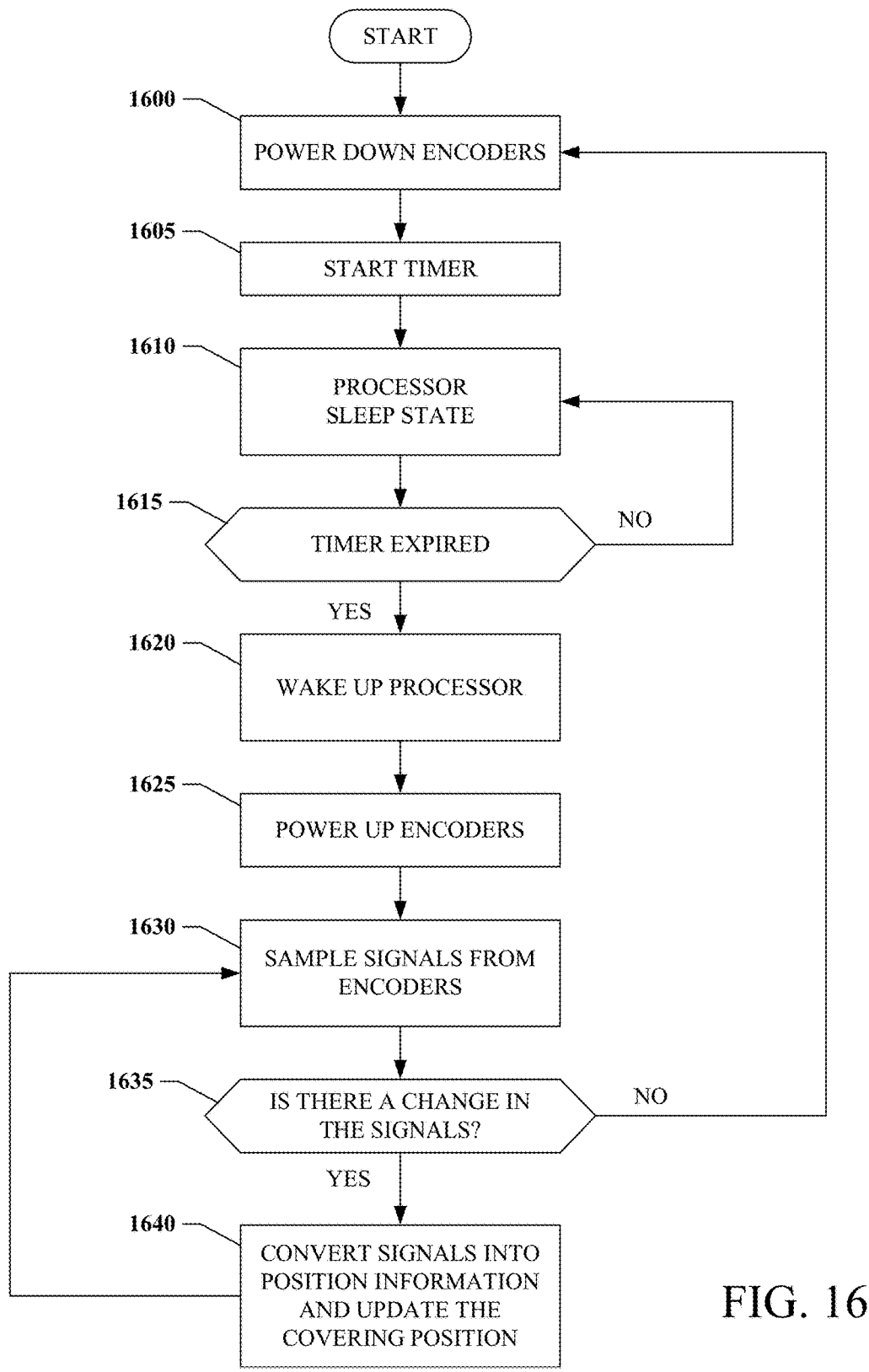
FIG. 16 is a flowchart representative of first machine readable instructions structured in accordance with one or more principles of this disclosure and which may be executed to implement the architectural covering controller of FIG. 11 to monitor a change in position of a covering.

FIG. 16 is a flowchart representative of machine readable instructions that may be executed to implement architectural covering controller 108 of FIGS. 1, 4, 6, 7, 8, 10, and/or 11 to monitor a change in position of the covering of motorized assembly 100 of FIG. 1 due to manual and/or motorized operation (e.g., in an implementation in which covering position encoder 120 is an analog encoder (e.g., the analog encoder 720 of FIG. 7)). The process of FIG. 16 may be performed continuously, periodically, and/or aperiodically to track the covering position.

At block 1600, movement controller 1120 of architectural covering controller 108 powering down encoders of motorized assembly 100 (e.g., covering position encoder 120, motor encoder 106, etc.). The encoders may be powered down in order to save power. Power saving may be particularly important if motorized assembly 100 is powered by a battery(ies) and/or a battery pack(s). At block 1605, movement controller 1120 starts a timer.

At block 1610, once the timer is started, movement controller 1120 enters into a sleep mode until the timer expires. If the timer has expired, an interrupt signal is sent, at block 1615, to movement controller 1120 by the timer. If the timer has not expired, movement controller 1120 continues to sleep until the timer expires. If movement controller 1120 receives the interrupt signal, movement controller 1120, at block 1620, exits sleep mode. The expiration rate for the timer can be set to any amount of time (e.g., 10 milliseconds, 1 second, etc.).

At block 1625, once architectural covering controller 108 exits sleep mode, movement controller 1120 powers up the encoders (e.g., covering position encoder 120, motor encoder 106, etc.). At block 1630, movement controller 1120 samples the signals from the encoders. Movement controller 1120 determines the location of the covering based on covering position information sent from covering position encoder 120. Additionally or alternatively, motor encoder 106 may be used to determine the location of the covering based on motor position information sent from a motor position encoder.

At block 1635, movement controller 1120 determines if there is a change in the signals sent from the encoders (e.g., due to manual or motorized movement of the covering). For example, the currently received signals are compared to signals stored in local memory 1125 for the last known position of the covering. If the current signals are the same as the signals stored in local memory 1125 (e.g., the covering has not been moved), control returns to block 1600 to power down the encoders and to return architectural covering controller 108 to a sleep mode until a new timer expires. If the current signals are not the same as the signals stored in local memory 1125 (e.g., the covering is moving and/or has been moved), movement controller 1120 converts, at block 1640, the signals into covering position information and stores the covering position in local memory 1125. Control returns to block 1612 to continue to sample the signals from the encoders until the signals stop changing (e.g., the movement of the covering ceases).

Figure 17:
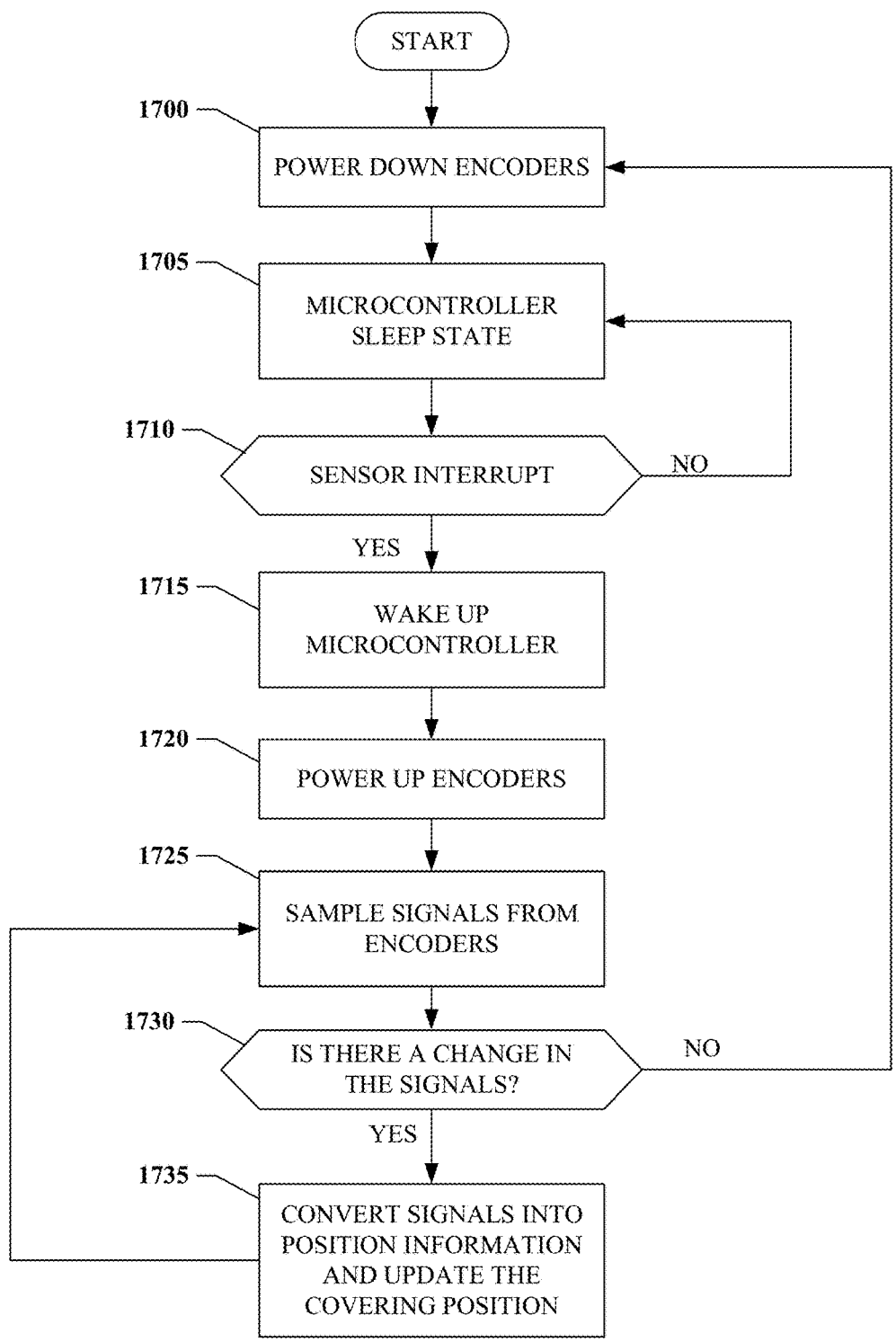
FIG. 17 is a flowchart representative of second machine readable instructions structured in accordance with one or more principles of this disclosure and which may be executed to implement the architectural covering controller of FIG. 11 to monitor a change in position of a covering.

FIG. 17 is a flowchart representative of machine readable instructions that may be executed to implement architectural covering controller 108 of FIGS. 1, 4, 6, 7, 8, 10, and/or 11 to monitor a change in position of the covering of motorized assembly 100 of FIG. 1 due to manual or motorized operation. For example, the process of FIG. 17 may be utilized as an alternative to the process of FIG. 16.

At block 1700, movement controller 1120 of architectural covering controller 108 powering down encoders of motorized assembly 100 (e.g., the covering position encoder 120, motor encoder 106, etc.).

At block 1705, architectural covering controller 108 enters into a sleep mode. At block 1710, a sensor interrupt is checked. The sensor may be a reed switch, a magneto-resistive sensor, Hall effect sensor, or any other device that can determine movement. The sensor may be attached to rotation rod 115 and/or another component that may be moved by operation of motorized assembly 100 to determine when motorized assembly 100 is operated (e.g., rotation rod 115 is moved). Rotation of rotation rod 115 (e.g., moving the covering) triggers the sensor to cause an interrupt signal to be sent to architectural covering controller 108. If the sensor does not trigger an interrupt (e.g., the covering has not moved), architectural covering controller 108 remains in the sleep mode. If the sensor has triggered an interrupt (e.g., the covering has moved), architectural covering controller 108, at block 1715, exits sleep mode.

At block 1720, once architectural covering controller 108 exits sleep mode, movement controller 1120 powers up the encoders (e.g. covering position encoder 120, motor encoder 106, etc.). At block 1725, movement controller 1120 samples the signals from the encoders. Movement controller 1120 determines the location of the covering based on the covering position information sent from covering position encoder 120. Additionally or alternatively, motor encoder 106 may be used to determine the location of the covering based on motor position information sent from a motor position encoder.

At block 1730, movement controller 1120 determines if there is a change in the signals sent from the encoders (e.g., due to manual or motorized movement of the covering). For example, the currently received signals are compared to signals stored in local memory 1125 for the last known position of the covering. If the current signals are the same as the signals stored in local memory 1125 (e.g., the covering has not been moved), control returns to block 1700 to power down the encoders and return architectural covering controller 108 to a sleep mode until there is a change in the signals sent from the encoder. If the current signals are not the same as the signals stored in local memory 1125 (e.g., the covering is moving and/or has been moved), movement controller 1120 converts, at block 1735, the signals into covering position information and stores the covering position in local memory 1125. Control returns to block 1725 to continue to sample the signals from the encoders until the signals stop changing (e.g., the movement of the covering ceases).

Figure 18:
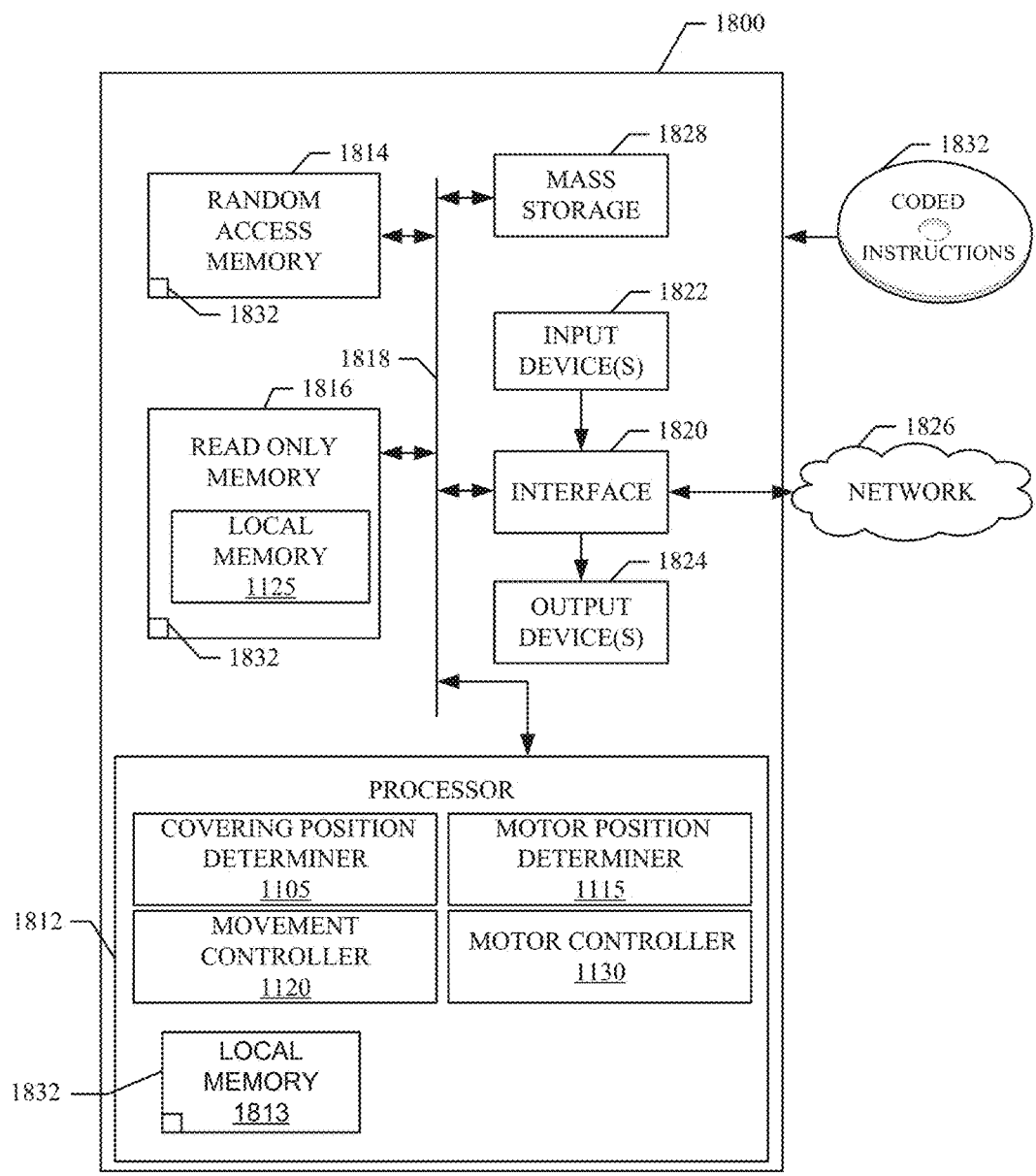
FIG. 18 is a block diagram of a processor platform structured in accordance with one or more principles of this disclosure to execute the machine readable instructions of FIGS. 6 and 7 to implement the architectural covering controller of FIG. 11.

FIG. 18 is a block diagram of processor platform 1800 capable of executing the instructions of FIGS. 12-17 to implement architectural covering controller 108 of FIGS. 1, 4, 6, 7, 8, 10, and/or 11 and/or a controller (e.g., a central controller) that is in communication with architectural covering controller 108. Processor platform 1800 can be, for example, a server, a personal computer, a mobile device (e.g., a cell phone, a smart phone, a tablet such as an iPad™), a personal digital assistant (PDA), an Internet appliance, or any other type of computing device.

Processor platform 1800 of the illustrated embodiment includes a processor 1812. Processor 1812 of the illustrated embodiment is hardware. For example, processor 1812 can be implemented by one or more integrated circuits, logic circuits, microprocessors, or controllers from any desired family or manufacturer.

Processor 1812 of the illustrated embodiment includes a local memory 1813 (e.g., a cache). Processor 1812 of FIG. 18 executes the instructions of FIGS. 12, 13, 14, 15, 16, and/or 17 to implement covering position determiner 1105, motor position determiner 1115, movement controller 1120, and motor controller 1130 of FIG. 11 to implement architectural covering controller 108. Processor 1812 of the illustrated embodiment is in communication with a main memory including a volatile memory 1814 and a non-volatile memory 1816 via bus 1818. Volatile memory 1814 may be implemented by Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1816 may be implemented by flash memory and/or any other desired type of memory device. Access to main memory 1814, 1816 is controlled by a memory controller. Non-volatile memory 1816 additionally includes local memory 1125 of FIG. 11.

Processor platform 1800 of the illustrated embodiment also includes an interface circuit 1820. Interface circuit 1820 may be implemented by any type of interface standard, such as an Ethernet interface, a universal serial bus (USB), and/or a PCI express interface.

In the illustrated embodiment, one or more input devices 1822 are connected to interface circuit 1820. Input device(s) 1822 permit(s) a user to enter data and commands into processor 1812. The input device(s) can be implemented by, for example, a sensor, a microphone, a camera (still or video), a keyboard, a button, a mouse, a touchscreen, a track-pad, a trackball, isopoint, and/or a voice recognition system.

One or more output devices 1824 are also connected to interface circuit 1820 of the illustrated embodiment. Output devices 1824 can be implemented, for example, by display devices (e.g., a light emitting diode (LED), an organic light emitting diode (OLED), a liquid crystal display, a cathode ray tube display (CRT), a touchscreen, a tactile output device, and/or speakers). Interface circuit 1820 of the illustrated embodiment, thus, typically includes a graphics driver card, a graphics driver chip, or a graphics driver processor.

Interface circuit 1820 of the illustrated embodiment also includes a communication device such as a transmitter, a receiver, a transceiver, a modem, and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

Processor platform 1800 of the illustrated embodiment also includes one or more mass storage devices 1828 for storing software and/or data. Embodiments of such mass storage devices 1828 include floppy disk drives, hard drive disks, compact disk drives, Blu-ray disk drives, RAID systems, and digital versatile disk (DVD) drives.

The coded instructions 1832 of FIGS. 12, 13, 14, 15, 16, and 17 may be stored in mass storage device 1828, in volatile memory 1814, in non-volatile memory 1816, and/or on a removable tangible computer readable storage medium such as a CD or DVD.

Although clutch 110 of FIGS. 1-3 and 8-9 is described in conjunction with architectural covering assemblies, clutch 110 may alternatively be utilized with other apparatus. For example, clutch 110 may be utilized with any apparatus to selectively couple a rotational output of one component (e.g., a motor) with another (e.g., a rotation rod).

Although the dual operation of architectural covering assemblies disclosed herein is described as (1) motorized operation and (2) manual operation, dual operation may include other combinations of operation modes (e.g., two forms of motorized operation (e.g., a solar-powered motor and a battery-powered motor), two forms of manual operation, etc.). Additionally, more than two forms of operation may be utilized (e.g., two forms of motorized operation may be combined with one form of manual operation). This disclosure is not limited to a particular combination of one, two, or more control mechanisms.

From the foregoing, it will be appreciated that the above disclosed methods, apparatus and articles of manufacture enable an architectural covering to be raised or lowered by a motor (e.g., controlled by a local and/or a central controller) while enabling a local user to also manually lower and/or raise the covering without resistance from the motor. The disclosed engaging/disengaging clutch addresses the technical problem of including dual control mechanisms (e.g., motorized and manual control, two motorized controls, etc.) in an architectural covering assembly and the controller continues to track a position of a covering during the motorized and manual operation. By disengaging the clutch after motorized operation of the architectural covering assembly, the manual operation to drive a rotation rod of which position can be monitored because the rotation rod, which is monitored by a position encoder, rotates without torquing or otherwise forcing rotation of a motor. The disclosed engaging/disengaging clutch provides the benefits of dual operation without the need for complex electromechanical clutches or other circuitry for engaging or disengaging a motor from a rotation rod of the architectural covering assembly.

Although certain methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus for operating a covering of an architectural covering, the apparatus comprising:
    a clutch to mechanically disengage a motor from operating a covering of an architectural covering when the motor is not in use;
    a manual control to move the covering of the architectural covering while the motor is disengaged; and
    a braking element to resist movement of a drive element of the covering when the motor is mechanically disengaged.

2. The apparatus of claim 1, further including a motor controller to:
    cause a cam follower of the clutch to move, in a first direction, to engage the motor with the drive element to move the covering; and
    cause the cam follower to move, in a second direction opposite the first direction, to disengage the motor.

3. The apparatus of claim 2, wherein the motor controller is structured to cause the cam follower of the clutch to further move in the second direction to engage the motor to move the drive element in the second direction.

4. The apparatus of claim 2, wherein the clutch includes a drive gear coupled to the drive element.

5. The apparatus of claim 1, wherein the manual control is configured to enable a user to move the covering while the motor is disengaged, wherein a force applied by at least one of the manual control or the motor overcomes the resistance provided by the braking element.

6. The apparatus of claim 1, further including a covering position determiner to track a position of the covering while the motor is disengaged.

7. The apparatus of claim 6, wherein the covering position determiner includes an encoder.

8. The apparatus of claim 1, further including a motor position determiner to track a position of the motor while the clutch disengages the motor.

9. The apparatus of claim 8, wherein the braking element is structured to resist movement of the drive element while the clutch disengages the motor.

10. The apparatus of claim 1, further including:
   a motor position determiner to monitor movement of the motor; and
   a motor controller to:
      cause an elongated member of the clutch to move, in a first direction, to engage the motor with the drive element by coupling a keyed surface of a cam follower to a mating keyed surface of a drive gear attached to the drive element;
      cause the elongated member to move, in a second direction opposite the first direction, to disengage the motor by decoupling the keyed surface of the cam follower from the mating keyed surface of the drive gear; and
      cause the elongated member to stop movement after a threshold has been met for disengaging the motor.

11. The apparatus of claim 10, wherein the elongated member is coupled to the motor.

12. The apparatus of claim 10, wherein the cam follower moves across a cammed surface of the elongated member.

13. The apparatus of claim 10, further including a covering position determiner to:
   monitor a position of the covering during movement of the covering by the motor and during manual movement of the covering; and
   determine when the covering is at a limit, wherein the motor controller is to cause the motor to reverse movement to disengage the drive element when the covering of the architectural covering reaches the limit.

14. The apparatus of claim 10, wherein the motor controller is structured to cause movement of the elongated member in the first direction to cause the cam follower to reach a stop causing the cam follower to move with movement of the elongated member.

15. The apparatus of claim 14, wherein the motor controller is structured to cause movement of the elongated member in the first direction to cause the cam follower to be moved toward the drive gear to couple the mating keyed surface of the drive gear with the keyed surface of the cam follower.

16. The apparatus of claim 15, wherein the motor controller is structured to cause movement of the elongated member in the second direction to allow the cam follower to move away from the drive gear to decouple the keyed surface of the cam follower from the mating keyed surface of the drive gear.

17. The apparatus of claim 10, wherein the braking element is structured to resist movement of the drive element while the motor is disengaging from the drive element.

18. The apparatus of claim 1, wherein the clutch is structured to disengage a shaft of the motor from the drive element.

19. The apparatus of claim 18, wherein the clutch is structured to disengage the motor from the drive element when a direction of rotation of the motor is reversed at an end of a motorized operation.

20. The apparatus of claim 1, wherein the manual control is structured to rotate the drive element to move the covering while the motor is disengaged.

21. A method for operating a covering of an architectural covering, the method comprising:
   tracking a first position of a covering by monitoring a covering position encoder;
   disengaging a motor from operating the covering to allow manual operation of the covering of the architectural covering when the motor is not in use; and
   tracking a second position of the motor via a motor encoder while the motor disengages.

22. The method of claim 21, further including:
   moving, in a first direction, a cam follower of a clutch to engage the motor with a drive element to move the covering; and
   moving, in a second direction opposite the first direction, the cam follower to disengage the motor from the drive element.

23. A tangible computer readable medium comprising instructions that, when executed, cause a machine to at least:
   track a first position of a covering by monitoring a covering position encoder;
   disengage a motor to allow manual operation of the covering when the motor is not in use; and
   track a second position of the motor via a motor encoder while the motor disengages.

* * * * *